United States Patent [19]
Ferrell et al.

[11] Patent Number: 6,152,238
[45] Date of Patent: Nov. 28, 2000

[54] CONTROL AND METHOD FOR POSITIONING A TOOL OF A CONSTRUCTION APPARATUS

[75] Inventors: Dirrick J. Ferrell; Ross C. Stoepker, both of Kentwood; Timothy E. Steenwyk; Eric Jon Walstra, both of Grand Rapids, all of Mich.

[73] Assignee: Laser Alignment, Inc., Grand Rapids, Mich.

[21] Appl. No.: 09/159,255

[22] Filed: Sep. 23, 1998

[51] Int. Cl.$^7$ .................................................. A01D 75/28
[52] U.S. Cl. .................................. 172/2; 172/781; 701/50
[58] Field of Search ................................ 701/50; 172/4.5, 172/4, 2, 781, 811

[56] References Cited

U.S. PATENT DOCUMENTS

| | | |
|---|---|---|
| 3,283,230 | 11/1966 | Davies et al. . |
| 3,636,325 | 1/1972 | Chytil . |
| 3,708,232 | 1/1973 | Walsh ...................................... 172/4 X |
| 3,727,332 | 4/1973 | Zimmer ..................................... 172/4.5 |
| 3,813,171 | 5/1974 | Teach et al. .......................... 172/4.5 X |
| 3,887,012 | 6/1975 | Scholl et al. .............................. 172/4.5 |
| 3,997,071 | 12/1976 | Teach . |
| 4,034,490 | 7/1977 | Teach . |
| 4,050,171 | 9/1977 | Teach . |
| 4,129,224 | 12/1978 | Teach . |
| 4,162,708 | 7/1979 | Johnson ................................... 172/4.5 |
| 4,231,700 | 11/1980 | Studebaker . |
| 4,273,196 | 6/1981 | Etsusaki et al. .......................... 172/4.5 |
| 4,286,386 | 9/1981 | Long . |
| 4,288,196 | 9/1981 | Sutton, II ............................. 172/4.5 X |
| 4,377,043 | 3/1983 | Inui et al. . |

(List continued on next page.)

FOREIGN PATENT DOCUMENTS

| | | |
|---|---|---|
| 0512584A2 | 11/1992 | European Pat. Off. . |
| 4201162A | 7/1992 | Germany . |
| 60033940 | 2/1985 | Japan . |
| 2232430 | 9/1990 | Japan . |
| 325126A | 2/1991 | Japan . |
| 427029A | 1/1992 | Japan . |
| 2101077 | 1/1983 | United Kingdom . |

OTHER PUBLICATIONS

Product bulletin entitled "Automatic Excavation Depth Measuring Device," published in the United States by Komatsu, publication date unknown.
Product brochure entitled "Laser–Level–System for Controlling Excavation Depth," published in the United States by Moba Electronics, publication date unknown.
Product brochure entitled "Hitachi Computing Monitor HCM–1," published in the United States by Hitachi, publication date unknown.
Product brochure entitled "Off to New Frontiers of Performance," published in the United States by O&K, publication date unknown.

*Primary Examiner*—Christopher J. Novosad
*Attorney, Agent, or Firm*—Van Dyke, Gardner, Linn & Burkhart, LLP

[57] ABSTRACT

A control system for establishing grade and elevation control for a tool of a construction apparatus for maintaining the vertical position of the tool relative to a reference includes a first ultrasonic transducer configured to be carried by the construction apparatus, with the first transducer transmitting and receiving acoustic waves, at least one reflector, a second ultrasonic transducer configured to be carried by the construction apparatus, with the second transducer receiving acoustic waves, and a controller coupled to the first and second ultrasonic transducers which drive the transducers to produce an acoustic wave and monitors the time reflections of the acoustic wave are respectively received by the first and second transducers. The controller determines the local speed of sound based on a first in time reflection received by the second ultrasonic transducer and determines the distance from the construction tool to a reference based on the local speed of sound and a second in time reflection received by both the first and second ultrasonic transducers. The controller produces at least one electrical signal as a function of the distance of the ultrasonic transducers from the reference. In preferred form, the controller communicates the signal to a positioning device, which signal actuates the positioning device to adjust the position of the construction tool with respect to the reference.

60 Claims, 14 Drawing Sheets

U.S. PATENT DOCUMENTS

| | | |
|---|---|---|
| 4,413,684 | 11/1983 | Duncklee ................................ 172/4.5 |
| 4,452,078 | 6/1984 | Formanek et al. . |
| 4,491,927 | 1/1985 | Bachmann et al. . |
| 4,514,796 | 4/1985 | Saulters et al. . |
| 4,535,699 | 8/1985 | Bühler . |
| 4,600,997 | 7/1986 | Cain et al. . |
| 4,633,383 | 12/1986 | Omachi et al. . |
| 4,693,598 | 9/1987 | Sehr . |
| 4,698,570 | 10/1987 | Satoh . |
| 4,722,044 | 1/1988 | Heiser et al. . |
| 4,726,682 | 2/1988 | Harms et al. . |
| 4,733,355 | 3/1988 | Davidson et al. ...................... 364/424 |
| 4,758,970 | 7/1988 | Keary et al. . |
| 4,771,389 | 9/1988 | Takahashi et al. . |
| 4,805,086 | 2/1989 | Nielsen et al. ....................... 172/4.5 X |
| 4,829,418 | 5/1989 | Nielsen et al. ....................... 172/4.5 X |
| 4,866,641 | 9/1989 | Nielsen et al. ....................... 172/4.5 X |
| 4,884,939 | 12/1989 | Nielsen . |
| 4,888,890 | 12/1989 | Studebaker et al. . |
| 4,910,673 | 3/1990 | Narisawa et al. . |
| 4,924,374 | 5/1990 | Middleton et al. ................. 364/167.01 |
| 4,945,221 | 7/1990 | Nielsen et al. . |
| 4,947,336 | 8/1990 | Froyd . |
| 5,065,326 | 11/1991 | Sahm . |
| 5,088,020 | 2/1992 | Nishida et al. . |
| 5,257,177 | 10/1993 | Bach et al. . |
| 5,327,345 | 7/1994 | Nielsen et al. ....................... 172/4.5 X |
| 5,356,259 | 10/1994 | Hanamoto et al. . |
| 5,430,651 | 7/1995 | Nielsen et al. ....................... 172/4.5 X |
| 5,438,771 | 8/1995 | Sahm et al. ............................ 172/7 X |
| 5,442,868 | 8/1995 | Ahn ........................................ 172/2 X |
| 5,446,980 | 9/1995 | Rocke . |
| 5,572,809 | 11/1996 | Steenwyk et al. ...................... 172/2 X |
| 5,671,554 | 9/1997 | Geelhoed ............................ 172/4.5 X |
| 5,682,311 | 10/1997 | Clark .................................... 172/4.5 X |
| 5,699,247 | 12/1997 | Moriya et al. ....................... 172/4.5 X |
| 5,711,022 | 1/1998 | Steenwyk ................................ 701/50 |
| 5,713,144 | 2/1998 | Haraoka ............................... 172/4.5 X |
| 5,799,419 | 9/1998 | Seo et al. . |
| 5,854,988 | 12/1998 | Davidson et al. ........................ 701/50 |

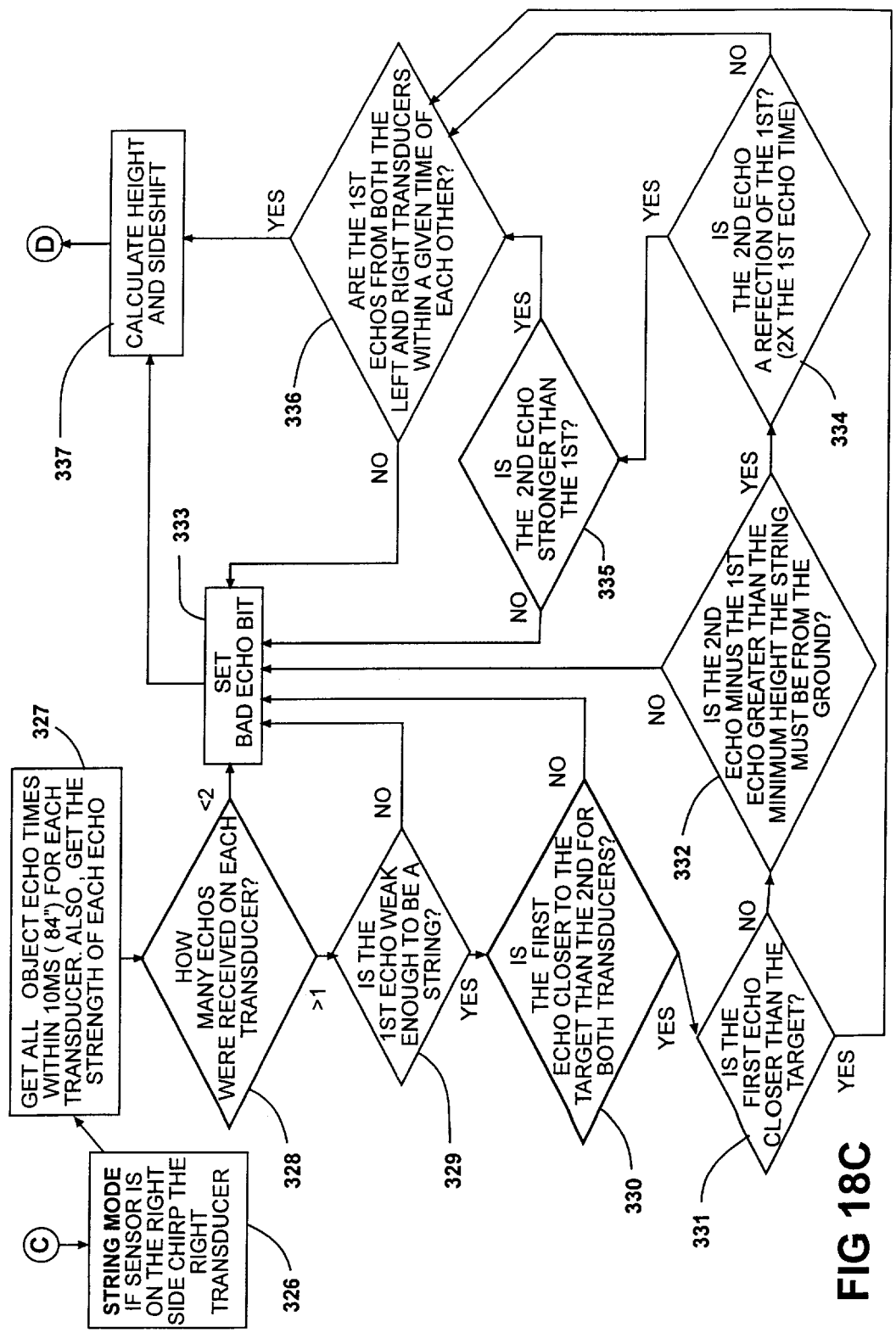

CONTROL AND METHOD FOR POSITIONING A TOOL OF A CONSTRUCTION APPARATUS

BACKGROUND OF THE INVENTION

The present invention relates to a control system for a construction apparatus which includes a tool that is capable of vertical and/or horizontal adjustment and, more particularly, to a control system which includes a device for measuring a reference in order to adjust the height and/or lateral displacement of the tool in response to the location of the reference.

Conventional controls that assist an operator of a construction apparatus in following a reference datum include mechanical sensors and, more recently, electromagnetic and acoustic sensors, for example ultrasonic transducer sensors. Mechanical sensors are mounted on the construction apparatus and typically contact a string which provides a reference datum. The location information of the reference datum is then used as input into a control system which adjusts the elevation or lateral position of the construction apparatus, including for example a tool such as a blade. However, these mechanical sensors often displace the string and, consequently, do not necessarily provide an accurate indication of the desired reference datum. Additionally, mechanical sensors are prone to being displaced off the string and require manual replacement back on the string.

Various control mechanism have been developed for construction implements, for example, some road graders include mechanical controls to adjust the lateral position of the blade relative to the grader. In U.S. Pat. No. 4,733,355 entitled NONCONTACTING RANGE SENSING AND CONTROL DEVICE shows a grader which includes a sensor that measures the lateral distance from a curb. However, the reference does not provide a practical scheme for controlling the blade height and lateral positions with respect to a curb. Further, the reference does not show a practical scheme for following a string.

Electromagnetic and acoustic sensors provide an improvement over mechanical sensors and offer a broader application. For example, electromagnetic and acoustic sensors can be used to locate a curb, a road bed, or the like as the datum which are less susceptible to inaccuracies since these datums do not move. However, these references are subject to anomalies, for example man holes. Furthermore, electromagnetic sensors and acoustic sensors require more elaborate electronic and/or circuitry. In addition, electromagnetic and acoustic sensors are affected by external factors, such as stray reflections and environmental conditions, including, for example, heat.

For example, U.S. Pat. No. 4,924,374 issued to Middleton et al., entitled METHOD FOR AUTOMATIC POSITION CONTROL OF A TOOL, discloses an ultrasonic sensor and control apparatus for a construction implement. The ultrasonic transducer measures the time it takes for an acoustic pulse to travel from the transducer to the reference surface and back to the transducer. Although these sensors provide an improvement over the mechanical sensors, the ultrasonic sensor only measures the time that it takes for a pulse to travel from the sensor to the reference surface and back; accordingly, the ultrasonic sensor only measures the absolute distance to the reference surface and not the true elevation of the implement. Furthermore, if the sensor is laterally shifted from a reference string, for example, there may be a large error introduced into the measurement.

In addition, since ultrasonic sensors are sensitive to environmental conditions, such as temperature and humidity, ultrasonic sensors require calibration to compensate for changes in the velocity of the acoustic pulse resulting from changes in local air conditions. Increases and decreases in velocity cause inaccuracy in the control system because the distance measured is a function of velocity. Various methods have been developed to overcome this problem. For example, in the Middleton patent, mentioned above, the control system includes a thermistor which senses variations in temperature and compensates for variations in temperature automatically. However, this thermistor does not provide an indication of all the air parameters that can affect the velocity of the acoustic pulse, such as humidity.

U.S. Pat. No. 5,327,345, issued to Edward G. Nielsen et al. entitled POSITION CONTROL SYSTEM FOR A CONSTRUCTION IMPLEMENT SUCH AS A ROAD GRADER, discloses a sensor system which utilizes three transducers. Two of the sensors are used to detect vertical and lateral distances of the sensor relative to a reference surface. The third transducer is used to calibrate the system which allows the velocity of acoustic wave to be accurately measured. In so doing, the third sensor accounts for increases and decreases in velocity due to changes in local air conditions. Consequently, the sensor system of the Nielsen patent measures the true vertical distance and true horizontal distance between the sensor and a reference.

Heretofore, ultrasonic reflectors are placed at a sufficient distance from the transducer so as not to return an echo until such time of the oscillation of the transmitting transducer has stopped or a separate transducer was used for calibration. This oscillation and the subsequent required delayed time in sensors further limits the proximity of the sensor unit to a target since the reflector must be spaced from the transducer. For example, in many applications, a reflector must be placed at a distance of eight to ten inches from the ultrasonic transducer, which as described above exposes the reflector to risk of damage. Consequently, the target for the ultrasonic transducer must be at some distance beyond the reflector so that the ultrasonic transducer can distinguish between the echo from the reflector and that from the target.

Additionally, conventional ultrasonic sensor systems require the datum to be positioned between the primary transducers, which result in the ultrasonic system protruding from the equipment since the sensor system must be positioned over the reference datum. In the U.S. and often in Europe it is necessary to locate the construction equipment in close proximity to or adjacent a structure, such as a building. This datum location may result in contact between the sensor, which is typically outboard from the construction equipment and the structure; therefore, the datum location limits the application of ultrasonic sensors in some cases.

Consequently, there is a need for a control system which has broad application and can be implemented with less complicated electronics and/or circuitry and, preferably, in a self-contained unit with a sensor that permits the construction apparatus to operate in close proximity to or adjacent a structure, such as a building or the like.

SUMMARY OF THE PRESENT INVENTION

According to the present invention, a control system for establishing grade and elevation control for a tool of a construction apparatus and for maintaining the vertical position of the tool relative to a reference includes first and second ultrasonic transducers, at least one reflector, and a controller. The first ultrasonic transducer transmits and receives acoustic waves. The second ultrasonic transducer receives acoustic waves. The controller is coupled to the first and second transducers and drives the first transducer to produce an acoustic wave and monitors the time that reflections of the acoustic wave are respectively received by the first and second transducers. The controller determines the local speed of sound based on a first in time reflection received by the second ultrasonic transducer and determines the distance from the construction tool to a reference based on the local speed of sound and based on a second in time reflection received by both of the first and second transducers. The controller produces at least one electrical signal as a function of the distance of the ultrasonic transducers from the reference.

In further aspects, the controller communicates the electrical signal to the positioning device, with the electrical signal actuating the positioning device to adjust the position of the construction tool with respect to the reference.

In other aspects, the control system further includes a second reflector which reflects the first acoustic wave from the first reflector to the second transducer. Preferably, at least one of the reflectors comprises a cylindrical member, for example an aluminum rod. Furthermore, at least one of the first and second reflectors is positioned in close proximity to one of the transducers. For example, at least one of the reflectors is positioned on a screen of the ultrasonic transducer.

According to another form of the invention, a control system for establishing grade and elevation control for a tool on a construction apparatus includes at least one sensor configured to be carried by the construction tool, with the sensor directing energy pulses toward a reference and receiving energy pulses reflected from the reference. Further, the control system includes a sensor control which is coupled to the sensor and which causes the sensor to generate energy pulses. The sensor control determines the position of the construction tool relative to the reference based on the received of energy pulses. Further, the sensor control selectively produces a drive signal in response to determining the position of the construction tool and transmits the drive signal to the tool positioning device to maintain a desired position of the construction tool with respect to the reference. In addition, the sensor control evaluates the characteristics of received energy pulses and determines whether the evaluated energy pulses represent valid or invalid received energy pulses. When the sensor control detects an invalid energy pulse is received, the sensor does not adjust the positioning device. When the sensor control detects a valid energy pulse, the sensor control adjusts the position of the positioning device.

In one aspect, the sensor control includes a selected mode control, with the mode control placing the sensor in a particular mode. For example, the mode control selection may select between at least a string mode, a ground mode, and a curb mode. In other aspects, the sensor control determines to which side the construction apparatus control system is mounted. For example, the sensor control may include an interface circuit for determining to which side the construction apparatus the control system is mounted.

The invention accordingly has several advantages. First, the control system utilizes only two sensors to measure the vertical and lateral distances from the tool to the reference which greatly simplifies the associated electronics and circuitry. Furthermore, the control system measures true distances since it takes into account the changes in measurements which arise from environmental conditions. In addition, the control system includes one or more built-in reflectors which are closely positioned to the sensors and, therefore, reduces the sizable distances between the sensor and the reference associated with conventional sensors. These and other objects and advantages and features of the invention will become apparent upon our review of the following specification in combination with the drawings.

BRIEF DESCRIPTION OF THE DRAWINGS

FIGS. 18A, 18B, and 18C illustrate a flow chart of an alternate operation of control system.

DETAILED DESCRIPTION OF THE PREFERRED EMBODIMENTS

Figure 1:
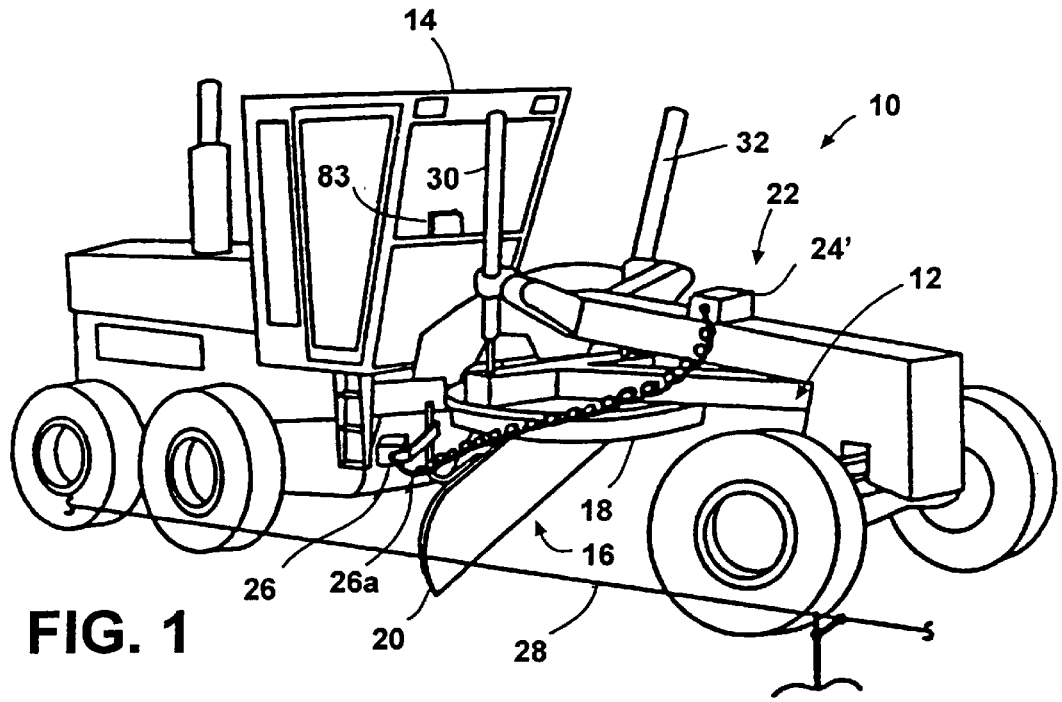
FIG. 1 is a perspective view of a construction apparatus including a control system according to the present invention.

Referring to FIG. 1, the numeral 10 generally designates a construction apparatus. In the illustrated embodiment, construction apparatus 10 includes a frame 12, which supports an operator housing 14 on the frame, and a tool or implement, such as a blade assembly 16, in a similar arrangement to that described in U.S. Pat. No. 5,327,345, the disclosure of which is incorporated in its entirety by reference herein. Blade assembly 16 includes a blade 20 and a blade support frame 18 which supports the blade 20 on frame 12 of construction apparatus 10. Construction apparatus 10 further includes a control system 22 for adjusting the position of blade 20 in response to the location of a reference or datum 28, for example, a string or a structure, including a curb, a ground surface, or the like.

Figure 2:
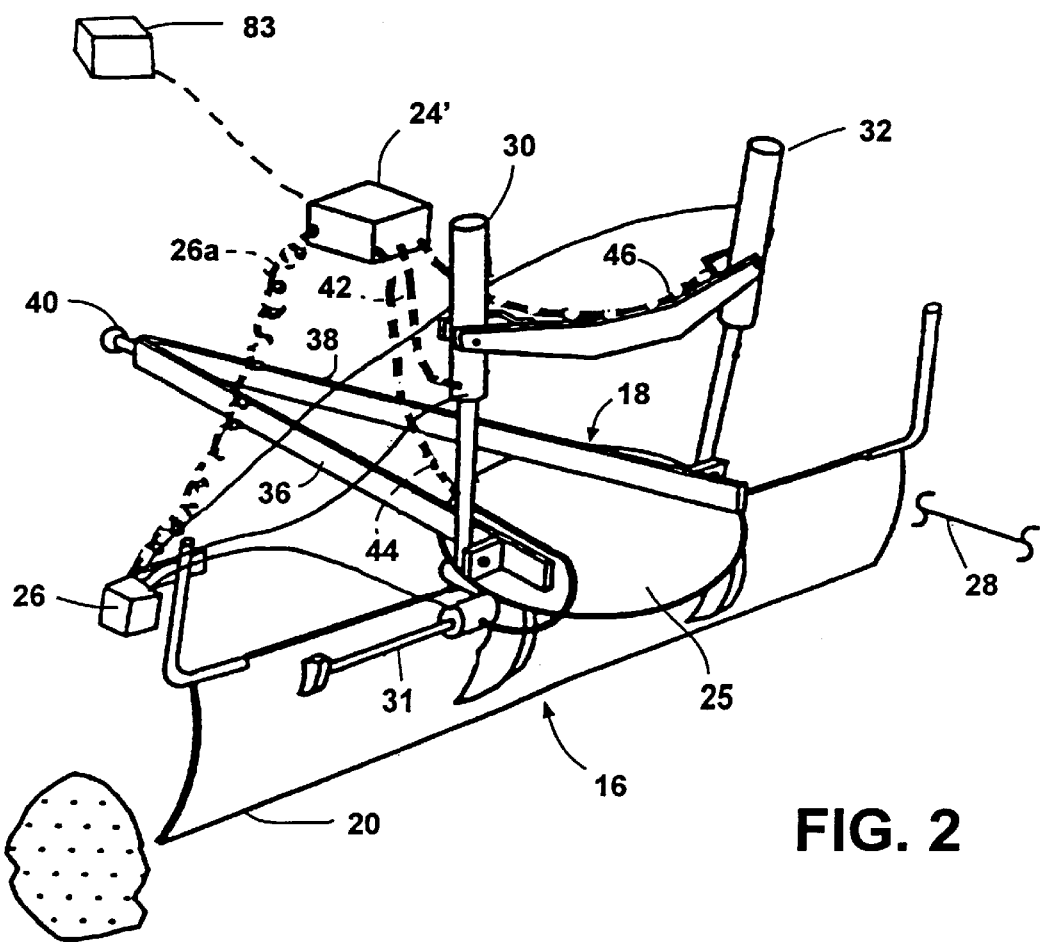
FIG. 2 is an enlarged perspective view of the tool and control system of FIG. 1.

Control system 22 includes control assembly 24 (FIG. 14), such as one or more microprocessors, and a distance measuring device or sensor assembly 26 which is coupled to control assembly 24 via conventional wiring or cable. As will be more fully described below, control assembly 24 and sensor assembly 26 are preferably housed in a single self contained unit. However, it should be understood that at least a portion of the control assembly may be housed in a separate control unit 24' (FIG. 2). Using sensor assembly 26, control system 22 measures the distance to reference 28 relative to the position of tool 20 in order to adjust the position of the blade as needed via control assembly 24. In the illustrated embodiment, reference 28 comprises a string; however, as described above that other references, including a curb or previously grated road bed or the like, can be used as the reference or datum for sensor assembly 26.

Referring to FIG. 2, control assembly 24 adjusts the position of blade 20 by actuating positioning members 30, 31, and 32, for example hydraulic cylinders, which raise or lower blade 20. As described above and best seen in FIG. 2, blade 20 is mounted to frame 12 by support frame 18. Support frame 18 includes platform 25 and a pair of support arms 36 and 38 which form a generally triangular shaped frame and include a ball joint 40 at their joined respective distal ends. Support arms 36 and 38 are mounted to blade platform 25 at their proximate ends. Ball joint 40 is carried by a socket (not shown), which is mounted to a front portion of frame 12 of construction apparatus 10. Thus, blade assembly 16 is pivotally mounted to frame 12. The lateral and vertical position of blade assembly 16 is adjusted by positioning members 30, 31, and 32, with positioning member 31 providing lateral displacement and positioning members 30 and 32 providing vertical displacement. As best seen in FIG. 2, where control system 22 includes a remote control unit 24', positioning members 30, 31, and 32 are coupled to control assembly 24' by cable or wire connectors 42, 44, and 46.

Figure 3:
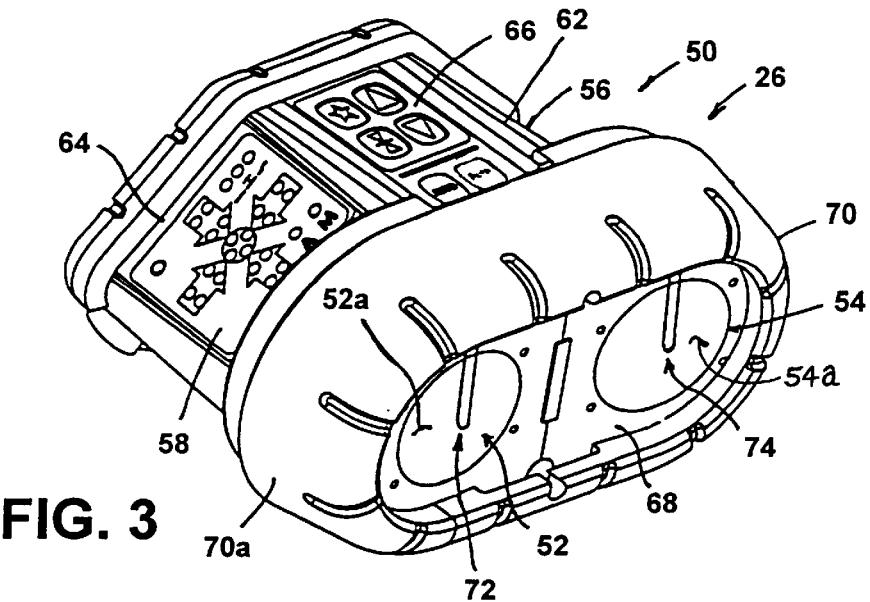
FIG. 3 is a bottom perspective view of a sensor unit of the control system of FIG. 1.
Figure 4:
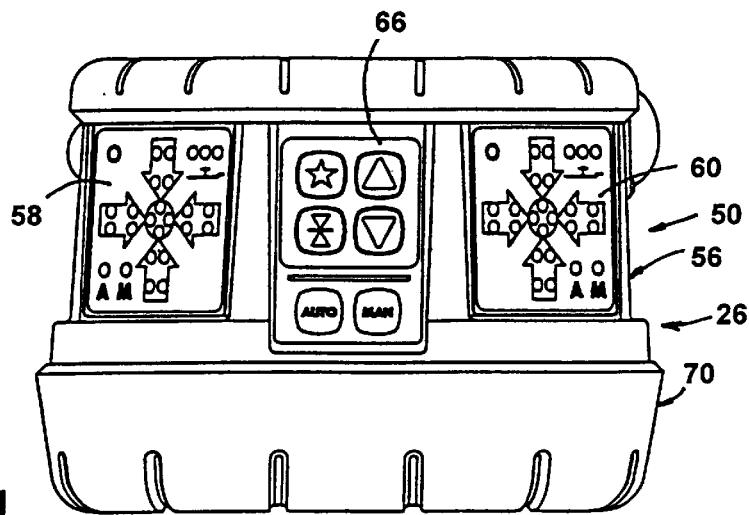
FIG. 4 is a front elevation of the sensor unit of FIG. 3.
Figure 5:
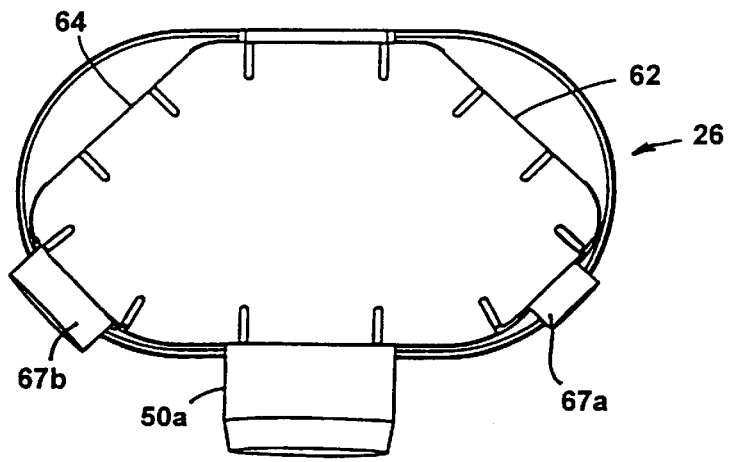
FIG. 5 is a top plan view of the sensor unit of FIG. 3.
Figure 6:
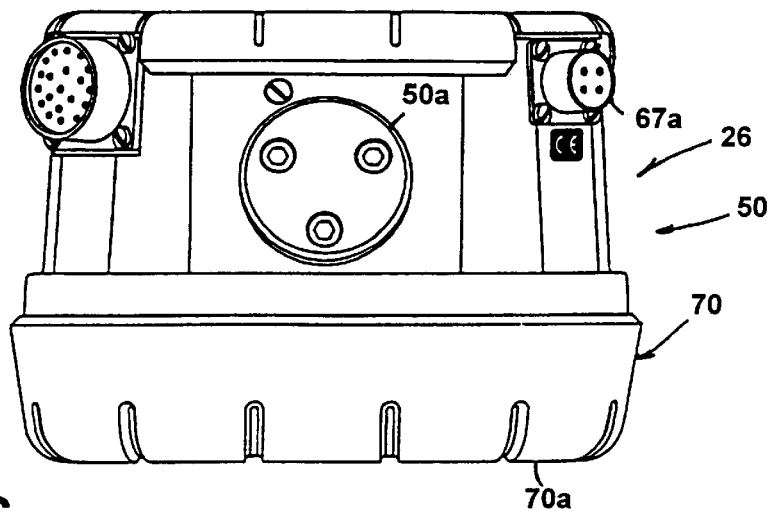
FIG. 6 is a rear elevation of the sensor unit of FIG. 3.

Referring to FIG. 3, sensor assembly 26 includes a housing 50 which supports a pair of spaced apart transducers 52 and 54. As best seen in FIG. 5, sensor assembly 26 optionally includes a mounting boss 50*a* for mounting sensor assembly 26 to construction apparatus 10. Preferably, transducers 52 and 54 are ultrasonic transducers and transmit and/or receive acoustic waves in a conventionally known manner, which are commercially available and may be, for example, provided by Part No. 604,142 manufactured by Polaroid Inc. Accordingly, transducers 52 and 54 are not described in greater detail herein. An upper portion 56 of housing 50 includes a pair of display panels 58 and 60 which are respectively mounted on angled portions 62 and 64 of upper portion 56 of housing 50. Display panels 58 and 60 which are preferably identical and produce redundant information, include indicators, for example LED's, which provide datum location information to the operator of sensor assembly 26. In addition the indicators on display panels 58 and 60 tell the operator the operating mode of the sensor and indicate in which direction the blade or other implement must be moved in order to be on target. In addition to the datum location information, display panels 58 and 60 provide an indication of the mode of operation (whether sensor assembly 26 is in the manual mode or automatic mode) and also indicates type of target (whether ground string or curb). Angled portions 62 and 64 are oriented generally at an angle with respect to each other so that sensor assembly 26 may be mounted on either side of construction apparatus 10 and yet permit the operator of the construction apparatus to view at least one of the display panels 58 or 60 without the need for rotating housing 50. The angle is not critical. In the illustrated embodiment, the angle is 90°. Positioned intermediate display panels 58 and 60 is a control panel 66. Control panel 66 includes an automatic or manual selection button and appropriate direction buttons for manually adjusting the sensor target height and further includes buttons for selecting the type of target. Referring to FIG. 6, sensor assembly 26 may also include a serial port 67*a* through which transducers 52 and 54, along with display panels 58 and 60 and control panel 66 can be electrically coupled to a remote control assembly, such as control assembly 24'. In addition, sensor assembly 26 includes a port 67*b* through which sensor assembly 26 and control assembly 24 couple to positioning devices 30, 31, and 32, as will be more fully explained in reference to the operation of control system 22.

As best seen in FIG. 3, transducers 52 and 54 are mounted to a recessed bottom wall 68 of a lower portion 70 of housing 50. In the illustrated embodiment, lower portion 70 is secured to upper portion 56 of housing 50 by fasteners 70*a* such as bolts or screws or the like; however, it should be understood that other means of securing lower portion 70 to upper portion 56 may be used. Sensor assembly 26 additionally includes a calibration system including a pair of ultrasonic reflectors 72 and 74, which are preferably placed on or near the screen 52*a* and 54*a* overlying the emitting surface of each ultrasonic transducer 52 and 54, respectively. In this manner, ultrasonic reflectors 72 and 74 create a path of a fixed distance over which ultrasonic energy may travel between the ultrasonic transducers for the purposes of obtaining local speed of sound information, which is then in turn used for the correction of ultrasonic ranging signals traveling in the same local air medium.

Figure 7:
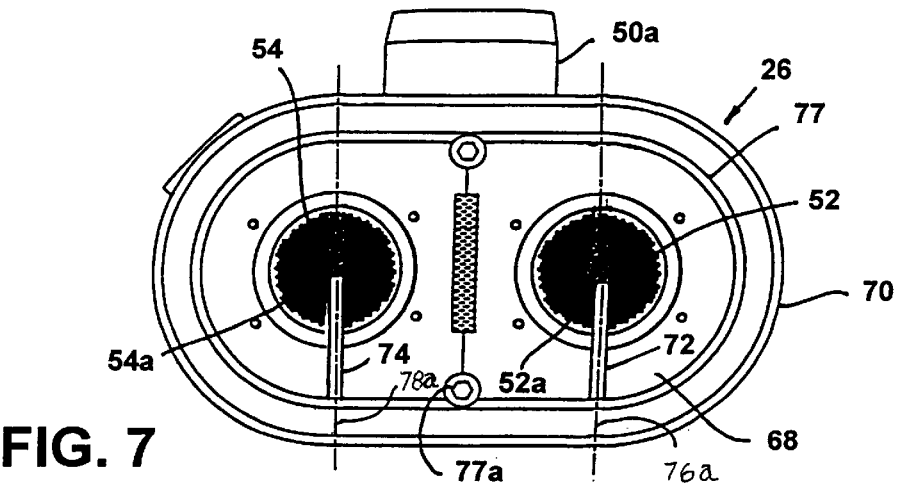
FIG. 7 is a bottom plan view of the sensor of FIG. 3 with the cover removed.

In this first embodiment, each of the ultrasonic reflectors 72 and 74 comprises a cylindrical rod segment 76 and 78. Cylindrical rod segments 76 and 78 may, for example, comprise a heavy gauge wire or rod, such as ⅛ inch aluminum rod. As best seen in FIG. 7, cylindrical rod segments 72 and 74 may be supported by a frame 77 which extends around transducers 52 and 54. Frame 77 is preferably integrally formed, such as by integral casting, with bottom wall 68. Preferably, rod segments 76 and 78 extend over approximately one half the diameter of the transducers front screen surface 52*a* and 54*a* (FIGS. 3 and 7). Furthermore, the center lines 76*a* and 78*a* of each of the respective cylindrical rods 76 and 78 are preferably approximately aligned with the center line of the screen of the respective transducer 52 or 54. Additionally, rod segments 72 and 74 preferably do not extend across the full diameter of the transducer screen surface; otherwise, this would allow the possibility for echoes from some target positions to be undetectable because the rod segments may block the path of that ultrasonic energy.

Figure 12:
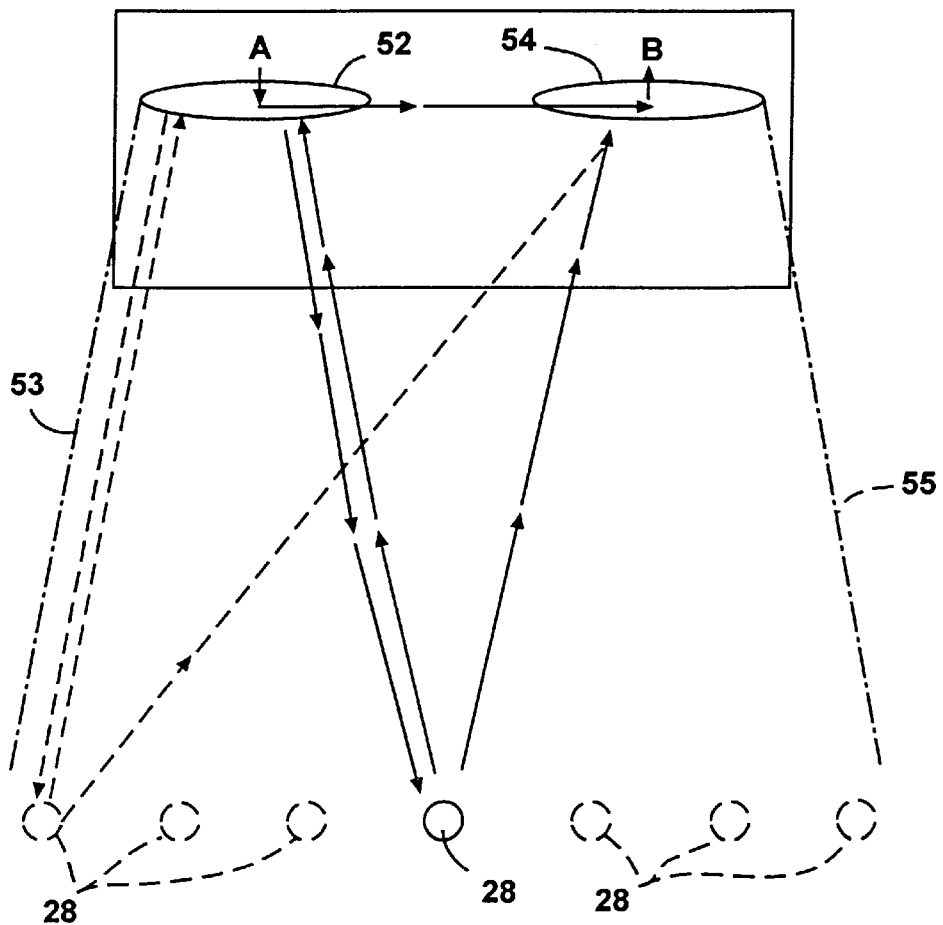
FIG. 12 is a diagram illustrating the sensors of FIG. 3 sending energy pulses to and receiving energy pulses from a datum.

Referring to FIG. 12, when ultrasonic energy (represented by the arrows) is emitted from transducer 52, some of this energy strikes the cylindrical surface of rod segment 72. A reflection of a portion of that ultrasonic energy occurs from the surface of rod segment 72 in a direction which is generally perpendicular or normal to the arrival path of the ultrasonic energy and in a direction which is generally towards second cylindrical rod segment 74 positioned over second transducer 54. Since the reflection from the cylindrical surface of rod 72 fans out, alignment between rod segments 72 and 74 is, therefore, not critical. Further, when the ultrasonic energy arrives at second rod segment 74, a portion of that wave is again reflected. The direction of a portion of the second reflection is generally perpendicular or normal to the arrival path of the ultrasonic energy. After the second reflection, a portion of the ultrasonic energy is heading in a direction which will cause it to impinge on the surface of second transducer sensor 54, thus completing a fixed distance path between first transducer 52 and second transducer 54. In this manner, transducer 52 acts as a transmitting or emitting transducer while transducer 54 acts as a receiver.

In contrast to sensors which use remotely mounted reflectors (otherwise known as "bails"), the first embodiment of the present invention provides closely positioned ultrasonic reflectors which do not protrude from the body of the sensing assembly 26 and, therefore, are not as prone to damage or being bent as conventional reflectors. In addition, measurements can be made to distances which are closer to sensor assembly 26 because there is no need to reserve the distance for the reflector echoes only. Moreover, the present sensor assembly only uses two transducers; thus the associated electronics and hardware of a third transducer associated with the Nielson '345 sensor assembly is eliminated. Consequently, the present invention provides an improvement over the Nielson '345 sensor assembly. Further, the first embodiment of the present invention provides a "built-in" reflector.

From the foregoing, it should be understood that one of transducers 52 and 54 effectively performs a "double duty"- one of the transducers acts in its original capacity as a transmitter only and the other as a receiver for the purposes of calibration. The transmitting transducer also acts as a receiver at a later time after it has finished oscillating. Both transducers are, therefore, available to act as receiving transducers for the purposes of determining distances and lateral positions of the datum which occurs only after the transmitting transducer is no longer oscillating. After an ultrasonic transducer transmits a pulse, it continues to oscillate at its natural frequency. This oscillation makes it temporarily unable to act as a receiving transducer because the energy in the oscillation is of a much greater magnitude than that of the echo returning from the reflector. In sensor assembly 26, the use of a second receive-only transducer avoids the oscillation problem, since it will always be ready to receive. In this way, the reflector mounting member can be very short or non-existent, as described above. Furthermore, the reflector can be placed on the surface of the transducer. As a result, the reflector is not precariously placed, and the references or datums may be closer to the ultrasonic transducer than heretofore sensor units have permitted.

Figure 8:
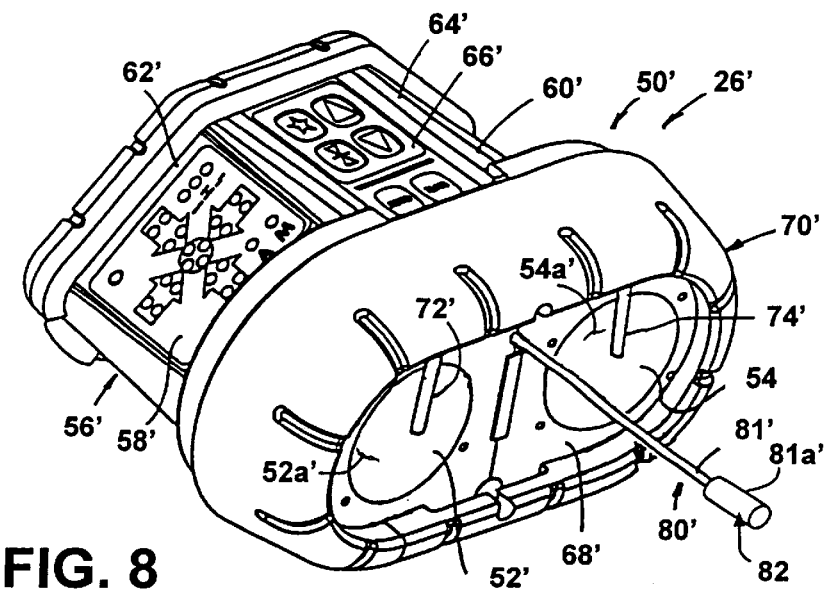
FIG. 8 is the same view as FIG. 3 of a second embodiment of the sensor unit of the present invention with a remote reflector mounted thereto.

Referring to FIG. 8, a second embodiment 26' of the sensor assembly of the present invention is illustrated. Sensor assembly 26' is of similar construction to sensor assembly 26 and includes a housing 50' which supports display panels 58' and 60' on respective angled portions 62' and 64' and a control panel 66' positioned intermediate display panels 58' and 60'. Furthermore, sensor assembly 26' includes a pair of transducers 52' and 54' mounted to a bottom wall 68' of housing 50' and a pair of cylindrical reflectors 72' and 74' which are respectively positioned in close proximity to transducers 52' and 54'. In a similar manner to reflectors 72 and 74, reflectors 72' and 74' provide a long term calibration distance. Similar to previous embodiment, transducers 52' and 54' are preferably ultrasonic transducers. In addition, sensor assembly 26' includes a remote reflector 80'. As will be more fully described below, remote reflector 80' is particularly suitable for situations where the environmental conditions are such that there is a high thermal gradient between the sensor assembly 26' and the datum to be measured or when control system 22 is being used under high wind conditions. Such high thermal gradient exists, for example when measuring hot asphalt.

Remote reflector 80' includes a support arm 81' which extends from bottom wall 68' of housing 50'. Positioned at the distal ends 81*a'* of support arm 81' is a reflector member 82'. Remote reflector 80' is positioned intermediate transducers 52' and 54' so not to interfere with reflections from the reference datum. Reflector member 82' preferably comprises a cylindrical member, such as a rod or wire and reflects waves from transducer 52' to 54'. Support arm 81' preferably has a length in a range of at least the long term calibration distance (the space between the center lines of the transducers) and less than the target distance, for example from about 8 inches to 13 inches in length. In this manner, the reflector member is placed closer to the target so that the calibration will account for the changes in the temperature between the sensor and the target. Further, remote reflector 80' is preferably removably mounted to bottom wall 68' of sensor assembly 26' so that reflector 80' can be removed when a remote reflector is no longer needed. As will be understood by those skilled in the art reflectors 72' and 74' are used for long term calibration and remote reflector 82' is used for short term calibration.

Figure 13:
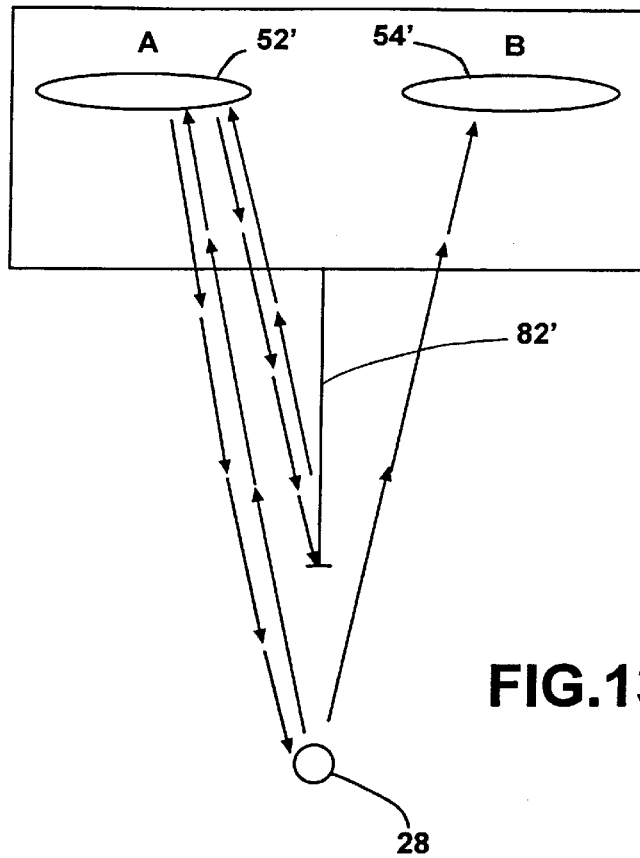
FIG. 13 is diagram illustrating the sensors and datum of the sensor unit of FIG. 8.

Referring to FIG. 13, when ultrasonic energy (represented by the arrows) is emitted from transducer 52', some of this energy strikes the surface of reflector member 82'. A reflection of that ultrasonic energy is then reflected off reflector member 82' back to transducer 52', thus completing a fixed distance path between the first transducer 52' and reflector member 82'. Similar to transducer 52 of sensor assembly 26, transducer 52' acts as a transmitting and receiving transducer while transducer 54' acts as a receiver.

Figure 9:
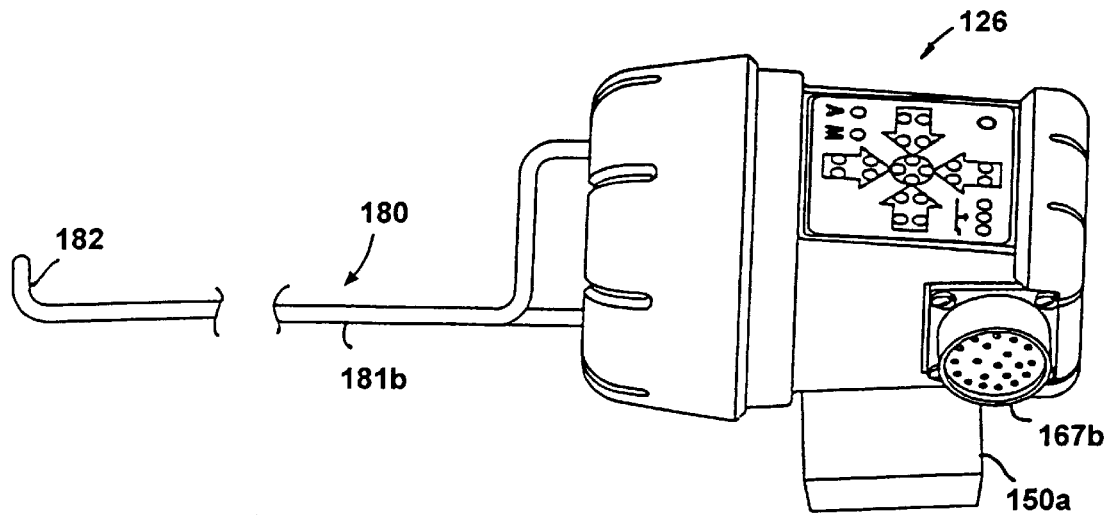
FIG. 9 is a side elevation view of a third embodiment of the sensor unit of the present invention.
Figure 10:
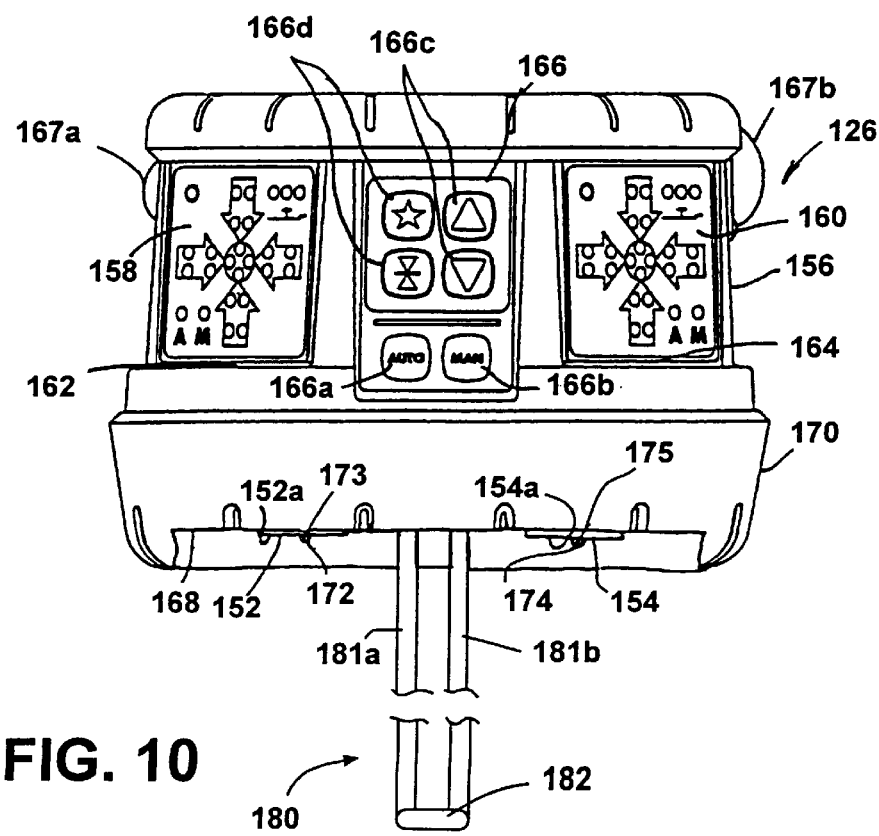
FIG. 10 is a front elevation of the sensor unit of FIG. 9.
Figure 11:
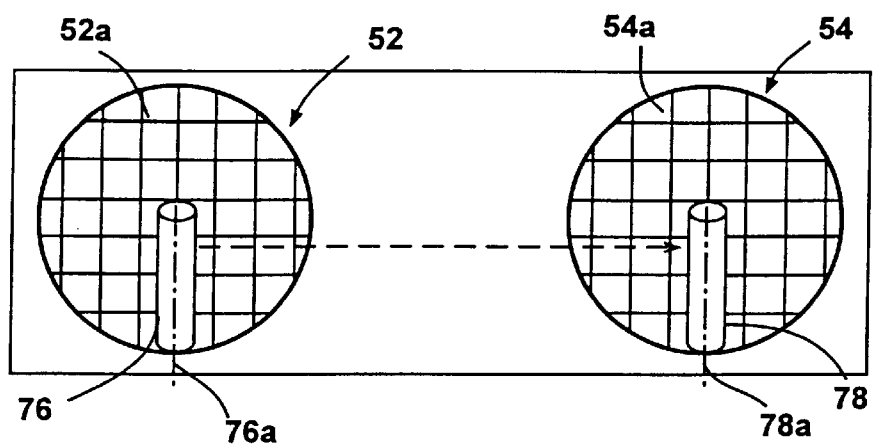
FIG. 11 is a diagram illustrating the sensors and reflectors of the sensor unit of FIG. 3.

Referring to FIGS. 9 and 10, a third embodiment 126 of a sensor assembly is illustrated. Sensor assembly 126 includes a housing 150 similar to housing 50 of the first embodiment, which supports a pair of spaced apart transducers 152 and 154, preferably ultrasonic transducers. Housing 150 also optionally includes a mounting boss 150*a* for mounting sensor 150 to apparatus 10. An upper portion 156 of housing 150 includes a pair of identical display panels 158 and 160 which are respectively mounted on angled portions 162 and 164 of upper portion 156 of housing 150 in similar manner to housing 50. Display panels 158 and 160 preferably include indicators, for example LED's, which provide datum location information, the mode of operation, and target information to the operator of sensor assembly 126. Angled portions 162 and 164 are oriented generally at an angle of 90° with respect to each other. In this manner, like sensor assembly 26, sensor assembly 126 may be mounted on either side of construction apparatus 10 and permits the operator of the construction apparatus to view at least one of the display panels without the need for rotating housing 150.

Positioned intermediate display panels 158 and 160 is a control panel 166 which includes automatic and manual selection buttons 166*a* and 166*b*, appropriate direction buttons 166*c* for manually adjusting the sensor target height and target selection buttons 166*d*. Referring to FIGS. 8 and 9, sensor assembly 126 may also include a serial port 167*a* through which transducers 152 and 154, along with display panels 158 and 160 and control panel 166, may be electrically coupled to a remote control unit, such as remote control assembly 24'. Sensor assembly 126 also includes a communication port 167*b* through which sensor assembly 126 and control assembly 24 communicate with positioning devices 30, 31, and 32.

As best seen in FIG. 10, transducers 152 and 154 are mounted to a recessed bottom wall 168 of a lower portion 170 of housing 150. Similar to the previous embodiments, sensor assembly 126 includes a pair of "close" reflectors 172 and 174, which are used for long term calibration, and a remote ultrasonic reflector 180, which is used for short term calibration. Remote reflector 180 includes a reflector member 182 spaced from transducers 152 and 154 and is supported by respective arms 181a and 181a. In this manner, similar to reflector 82', ultrasonic reflector member 182 creates a path of a fixed distance over which ultrasonic energy may travel from ultrasonic transducer 152 and back for purposes of obtaining the short term local speed of sound information, which is then in turn used for the correction of the ultrasonic signals traveling in the same local air medium. Similar to second embodiment, remote reflector 180 is particularly suitable for paving applications where large temperature gradients are present. Ultrasonic reflector 180 comprises a cylindrical member, for example heavy gauge wire or rod, for example ⅛ inch aluminum rod. As described in reference to the first embodiment, reflectors 172 and 174 preferably extend over approximately one half the diameter of transducers 152 and 154. Furthermore, the center lines 173 and 175 of each of the respective reflectors rods 172 and 174 are approximately aligned with the respective center lines of screens 152a and 154a of the respective transducers 152 or 154 and, further, preferably do not extend more than halfway across the transducers 152 and 154 to avoid interfering with the reflection from the reference or datum.

When ultrasonic energy (represented by the arrows) is emitted from transducer 152, some of this energy strikes the cylindrical surface of the rod segment 172. A reflection of a portion of that ultrasonic energy occurs from the surface of rod segment 172 in a direction which is generally perpendicular or normal to the arrival path of the ultrasonic energy and in a direction which is generally towards second cylindrical rod segment 174 positioned over second transducer 154, in a similar manner to the first embodiment. Further, when the ultrasonic energy arrives at second rod segment 174, it is again reflected. The direction of the second reflection is generally perpendicular or normal to the arrival path of the ultrasonic energy. After the second reflection, a portion of the ultrasonic energy is then heading in a direction which will cause it to impinge on the surface of second transducer 154, completing a fixed distance path between first transducer 152 and second transducer 154. Thus, the long term local speed of sound can be calculated for calibrating the reflections from the reference datum to provide a more accurate reading of the distance from the transducers to the reference.

Figure 14:
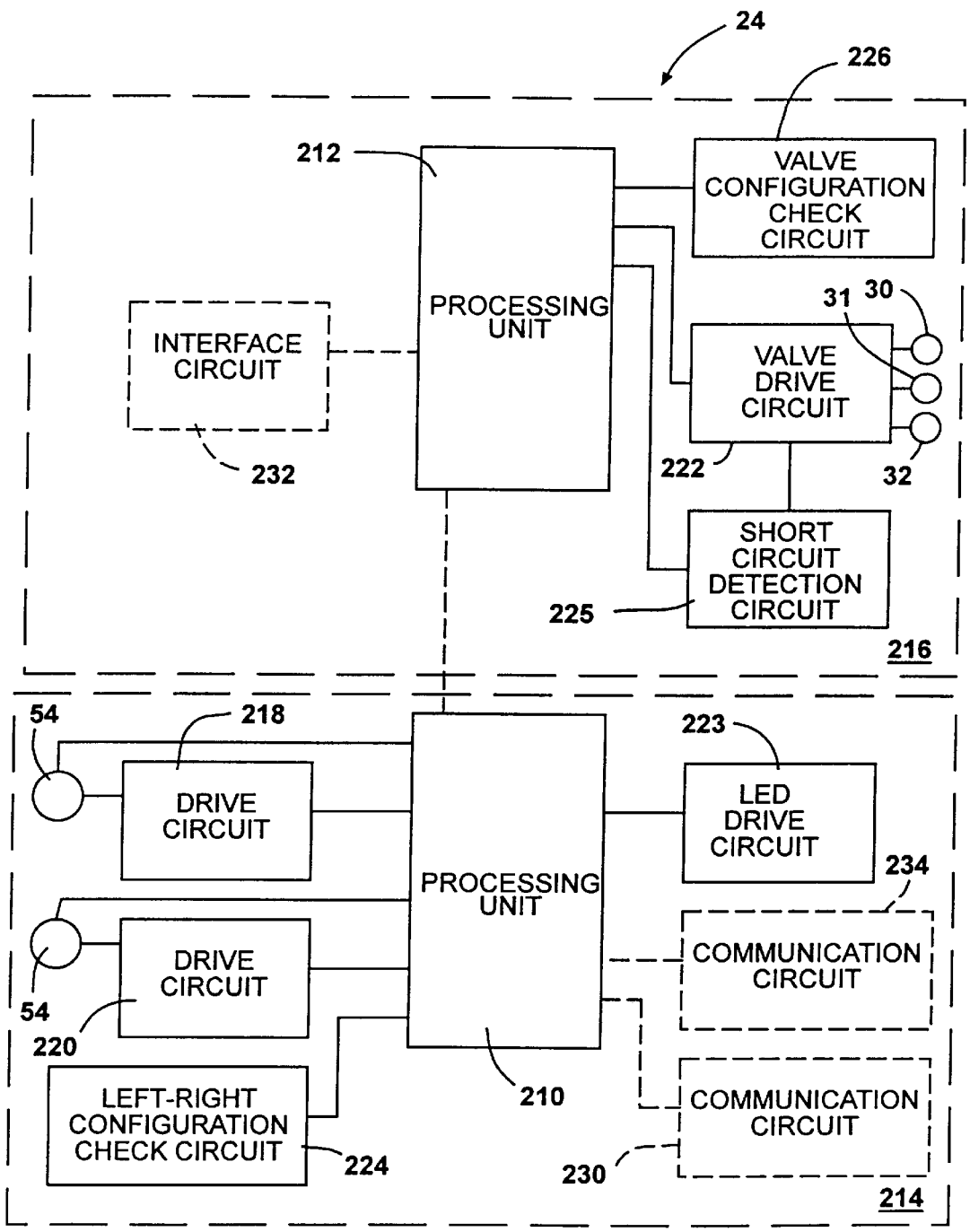
FIG. 14 is an electronic block diagram of the control system of the present invention.

Referring to FIG. 14, control assembly 24 preferably includes a first processing unit 210, such as a microprocessor, which is in communication with transducers 52 and 54 (52', 54', 152, 154) and a second processing unit 212, which is in communication with and drives positioning devices 30, 31, and 32. Each processing unit 210, 212 may be mounted on a respective circuit board 214 and 216. In this manner, either one or both processing units 210 or 212 may be incorporated into sensor housing 50 or one of the processing units, preferably, processing unit 212, may be positioned or housed in remote control assembly 24'. Furthermore, as will be more fully discussed below, depending on the application, processor 212 and circuit board 216 are optional.

Processing unit 210 drives transducers 52 and 54 (hereinafter reference will be made to transducers 52 and 54, but is should be understood that this includes references to transducers 52', 54' and 152, 154) through respective first and second drive circuits 218 and 220. In this manner, processing unit 210 receives signals from and transmits drive signals to transducers 52 and 54. Processing unit 210 is in communication with processing unit 212 which provides outputs to a valve drive circuit 222. Based on information from transducers 54 and 52, processing unit 210 calculates the height of tool 20 with respect to reference 28 and compares the actual distance between the tool and the reference 28 to a target reference distance to determine whether positioning devices 30, 31 and/or 32 need to be actuated in order to move the tool to a desired position relative to the reference. Such calculations include corrections for variations in the speed of sound. The position information is then transmitted from processing unit 210 to processing unit 212 so that valve drive circuit 222, under the control of processing unit 212, will adjust the position of one or more positioning devices 30, 31, and 32 to move tool 20 to its desired position relative to the reference datum unless the valve drive circuit is disabled in a manner set forth in more detail below.

Figure 19:
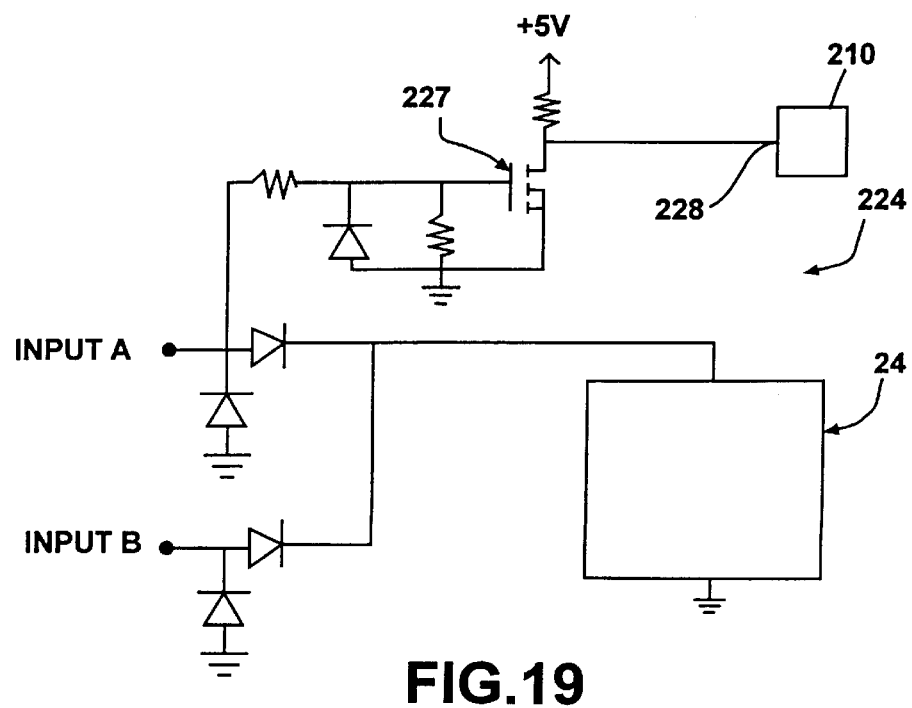
FIG. 19 is an electronic schematic diagram of an interface circuit for determining the side of the construction apparatus to which the sensor unit is mounted.

In addition, control system 24 includes an LED drive circuit which drives the appropriate LED's on display panels 58 and 60 to indicate the relative position of tool 20 to reference 28. Furthermore, control system 24 includes a left-right configuration check circuit 224 to detect the side of construction apparatus 10 to which sensor assembly 26 is connected. As best seen in FIG. 19, left-right configuration check circuit 224 includes two inputs, input A and input B for coupling to ground and power. Whether positive power comes into circuit 224 on input A or input B establishes whether sensor assembly 26 is coupled to the left or right side of construction apparatus 10. If positive power is input into input A, field effect transistor 227 will go high and node 228 of circuit 224, which is coupled to processing unit 210, will have a logic level low. In contrast, if positive power is input into input B, field effect transistor 227 will not turn on and node 228 will be a logic level high.

Referring again to FIG. 14, processing unit 212 is connected with a valve configuration check circuit 226. Valve configuration check circuit 226 determines the configuration of the solenoid operated valves of the construction apparatus, such as whether the valve solenoid configuration on the valves of the positioning devices are positive or negative common. Valve solenoid coils provide low resistance paths to positive power or ground depending on whether the valve configuration is positive or negative common. As will be more fully described below in reference to FIG. 16, valve configuration check circuit 226 determines the configuration of the respective valves so that drive valve circuit 222 can be appropriately configured by processing unit 212.

Figure 16:
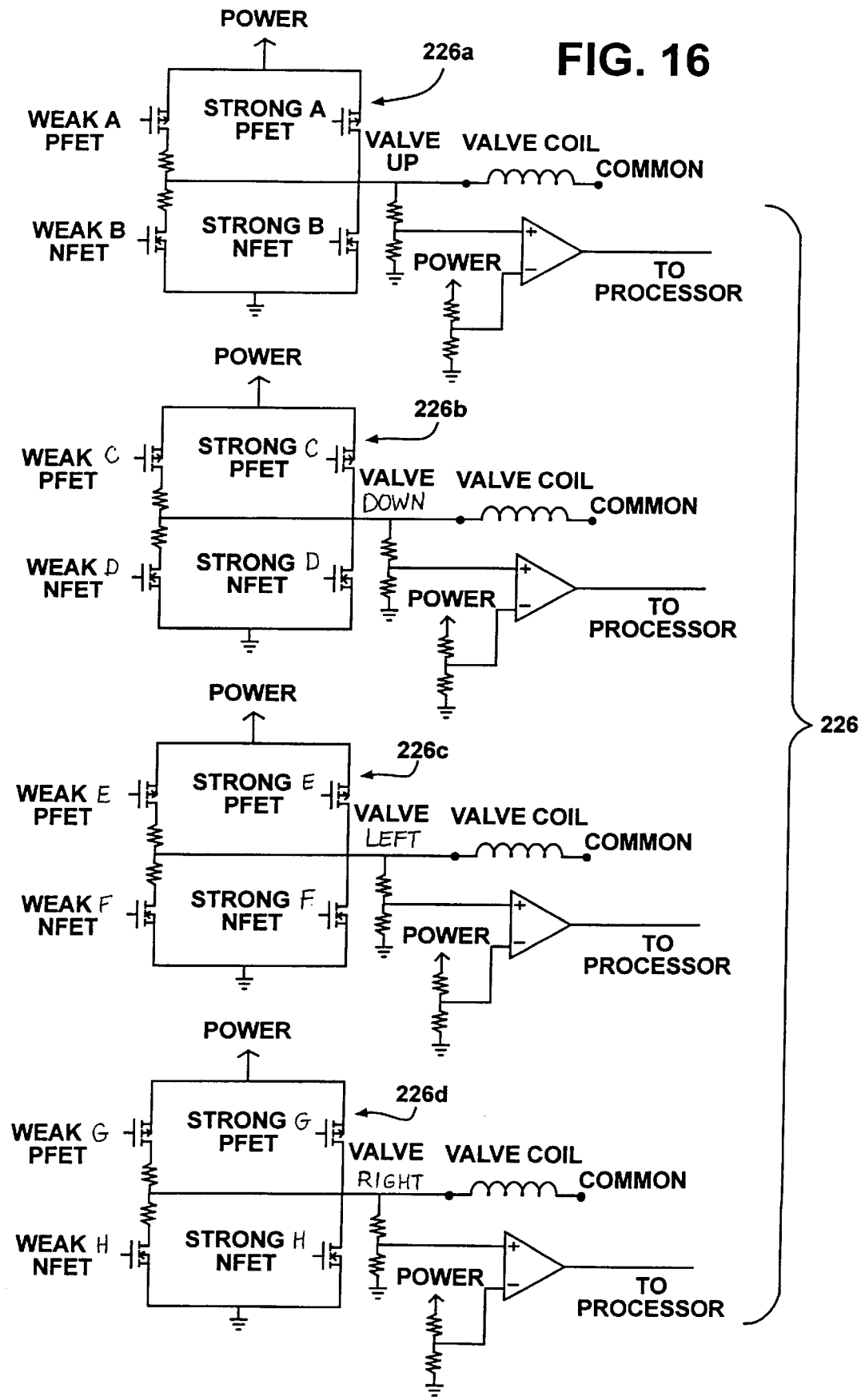
FIG. 16 is an electrical schematic diagram of an interface circuit for checking valve configuration.
Figure 17:
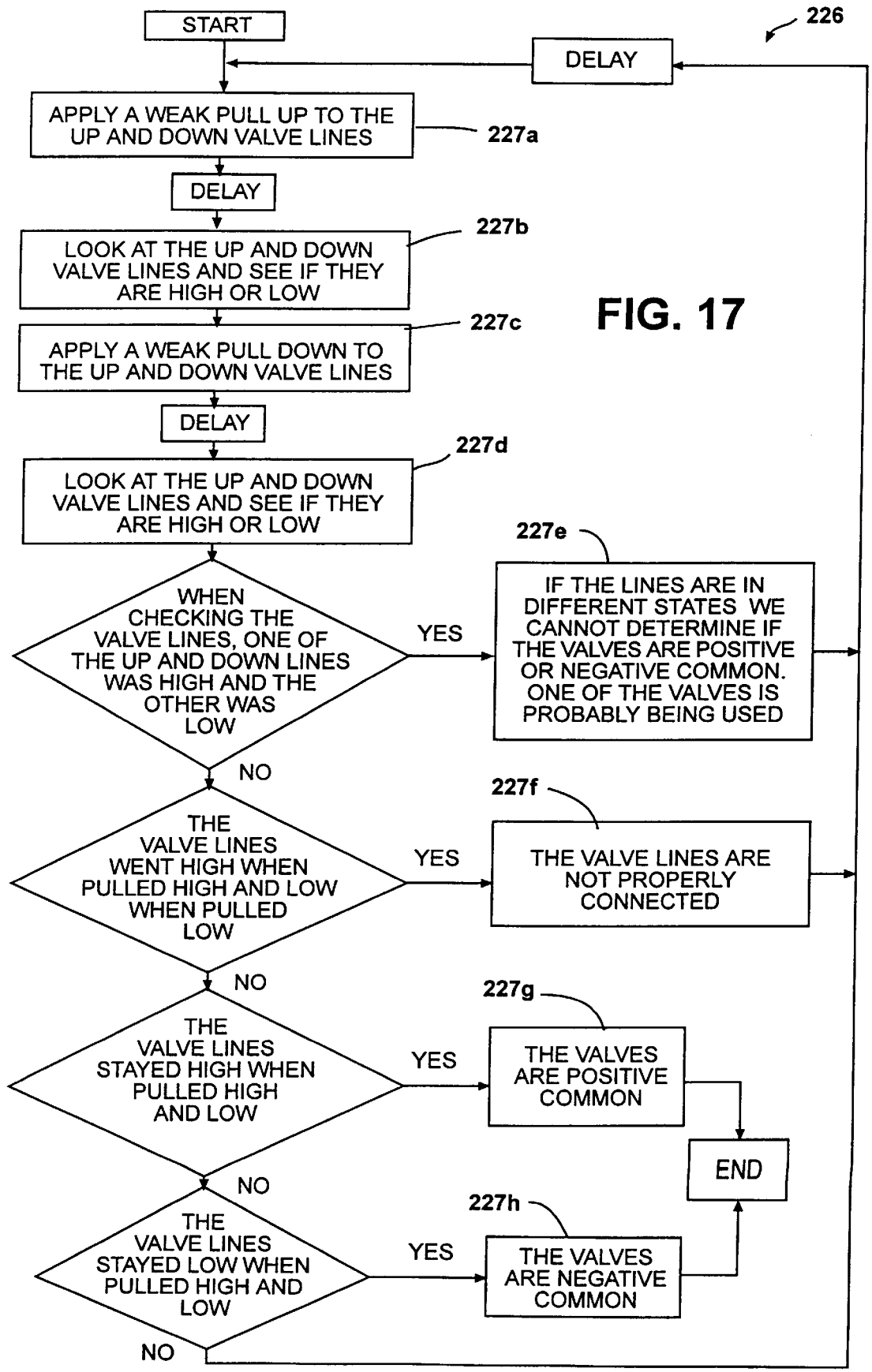
FIG. 17 is a flow chart of a valve configuration check process.

As best seen in FIG. 16, interface circuit or valve configuration check circuit 226 includes four sub-circuits 226a, 226b, 226c, and 226d, with each sub-circuit being associated with a respective valve (up, down, left, right) of positioning devices 30, 31, and 32. Valve configuration check circuit 226 determines what type of valve it is encountering by detecting the current through the coil. Valve coils, which are driven by a stand alone ultrasonic sensor, have three possible electrical configurations: high-side common, low-side common, or floating. When a valve coil is driven the wrong way, it becomes a short circuit condition. The control system 22 is able to determine to which of these configurations it is connected. Referring to the flow chart in FIG. 17, interface or valve configuration check circuit 226 applies a weak pull up voltage to the respective valve lines by operating weak A, weak C, weak E, and weak G p-channel field effect transistors (PFET) (227a). It should be understood that other types or transistors or electromagnetic devices, including relays, to source or sink or to activate the valve coils can be used. After a short delay, the interface or valve configuration check circuit 226 then detects whether the respective valve lines are high or low (227*b*) and then applies a weak pull-down voltage to the up and down valve lines by operating the weak B, weak D, weak F, and weak H n-channel field effect transistors (NFET) (227*c*). Again, after a short delay, the interface or valve configuration check circuit 226 detects whether the valve lines are high or low (227*d*). If the interface or valve configuration circuit 226 determines that one of the valve lines is high and the other low (227*e*), then the process is repeated. However, if the circuit detects that the valve lines went high when pulled high and went low when pulled low, the valve configuration check circuit 226 indicates to processing unit 212 that the valve lines are not properly connected and returns to the beginning of the valve check sequence (227*f*). However, if the valve lines stay high when pulled high and low, then the interface or valve configuration check circuit 226 indicates to processing unit 212 that the valves are positive common (227*g*). When interface or valve configuration check circuit 226 determines that the valve lines stay low when pulled high or low, then circuit 226 indicates to processing unit 212 that the valves are negative common (227*h*). Then, drive circuit 222 is appropriately configured by processing unit 212 by turning on the appropriate FETs for valve configuration. For example, if the valve solenoid coils are positive common, processor 212 turns on the strong B, D, F, and H N-channel field effect transistors (NFETs). Whereas, if the valve solenoid coils are negative common, processor 212 turns on the strong A, C, E, G (PFETs). In addition, processing unit 212 preferably includes a short circuit detection circuit 225 which is configured to detect whether drive circuit 222 has a short circuit, which can be used to worn the operator of construction apparatus 10 that control system 22 is malfunctioning.

Optionally, processing unit 210 permits sensor assembly 26 to transmit waves and receive reflected waves from a reference that is positionable anywhere in the sensing range of the transducers. As best seen in FIG. 12, together transducers 52 and 54 have a sensing range defined between leading edges 53 and 55. Therefore, provided the reference lateral position is located within the sensing ranges of transducers 52 and 54, in other words, between leading edges 53 and 55, sensor assembly 26 can measure the vertical and lateral distances to reference 28. The range of the reference location is accounted for in the triangulation calculation and established under software control. Consequently, a reference can be located at or near or outside one edge of the transducers 52 and 54 so as to allow sensor assembly 26 to work in close proximity or immediately adjacent a structure, such as a wall or the like, without obstruction.

Furthermore, control assembly 24 optionally includes a communication circuit 230, which is adapted to permit communication between processing unit 210 and a remote control panel. For example, communication circuit 230 may be coupled to a remote control panel 83 located in the cabin (FIGS. 1 and 2). In this form, communication circuit 230 is preferably configured to permit remote control panel 83 to override valve drive circuits 222 and, instead, to permit remote control panel 83 to directly drive positioning devices 30, 31, and 32 through processing unit 212. In another example, control assembly 24 includes a communication circuit 234 which may be configured to permit communication with a hand held remote device (not shown), such as an infrared device which may optionally override control panel 66 to adjust target height. It should be understood that the remote device may be configured to activate other features. Again referring to FIG. 14, control assembly 24 also optionally includes a digital analog interface circuit 232, which is coupled to processing unit 212 and enables sensor assembly 26 to be used in an existing analog system, for example in paver or trimmer systems.

Furthermore, control assembly 24 may use communication circuit 230 to communicate with a remote panel, such as in a paving system. Such remote panels may optionally control the valves directly or may provide an override circuit which permits control assembly 24 to directly drive positioning devices 30, 31, and 32 without the ultrasonic data from transducers 52 and 54.

It should be understood from the foregoing that control system 22 may include other features which enable processing unit 210 or processing unit 212 to communicate with external devices or other systems. Furthermore, as described above, processing units 210 and processing 212 and their respective circuit assemblies may both be mounted in sensor unit housing 50, or processing unit 212 and its associated circuits may be remotely mounted, for example in control assembly 24' or in remote control panel 83 inside cabin 14.

OPERATION OF CONTROL SYSTEM

Figure 15A:
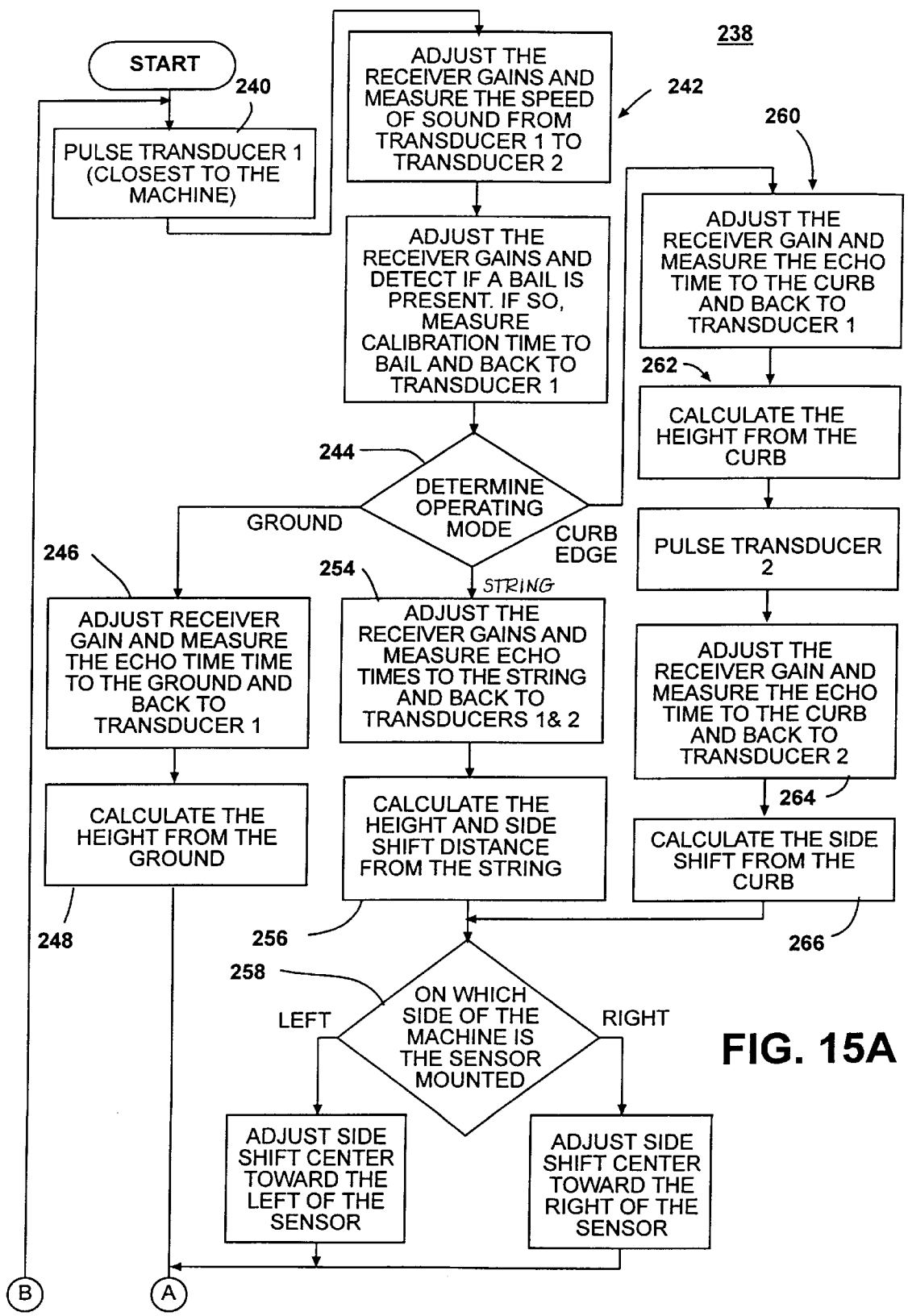
FIGS. 15A and 15B illustrate a flow chart of the operation of the control system of the present invention.
Figure 15B:
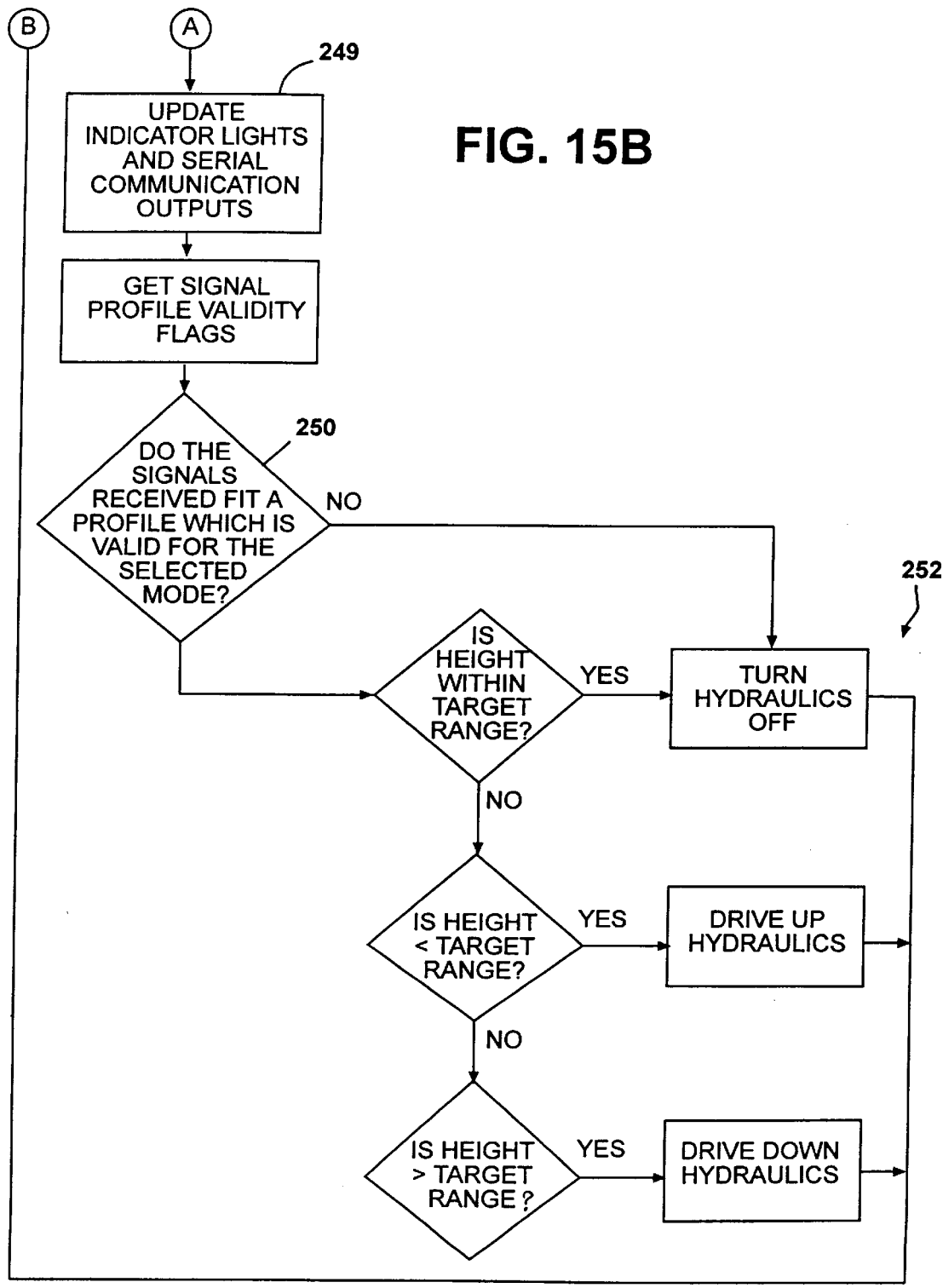

Referring to FIG. 15, processing unit 210 initializes the measuring process (238) by pulsing (240) one of the ultrasonic transducers, for example, transducer 52. Reference hereinafter will be made to the first embodiment of sensor assembly 26 for ease of description, but it should be understood that the operation described herein also may apply to sensor assembly 26' or assembly 126. Initially, processing unit 210 adjusts the receiver gains and measures the speed of sound from transducer 52 to transducer 54 (242) using the principles disclosed in the Nielsen '345 patent. After the speed of sound is measured, processing unit 210 measures the calibration time from the reflector back to, for example, transducer 52 and detects if a reflector is present. If a reflector is not detected, then the reflector or bail flag is cleared. If a reflector is detected within an appropriate distance, then the bail flag is set in processing unit 210. Depending upon the mode under which the system is operating, processing unit 210 adjusts the gain to each transducer 52 and 54. In the configuration with the reflectors at or near the emitting surface of the transducer, the gain is set at a low gain since reflections from close reflectors are very strong. After the speed of sound is calculated and the calibration time is measured, processing unit 210 then checks the operating mode of the system (244) as set by user on control panel 66 and displayed on display panels 58 and 60.

Referring back to FIG. 15, if processing unit 210 determines at 244 that a ground profile is selected, control passes to 246 where the receiver gain is adjusted again and processing unit 210 measures the echo time to the ground and back to transducer 52. Based on the echo time, processing unit 210 calculates the height from the ground (248). Based on the height information, processing unit 210 updates the indicator lights of panels 58 and 60 and serial communication outputs through port 67 (249). If processing unit 210 determines that the signal profile fits the profile for the reference associated with the selected mode, then processing unit 210 signals processing unit 212 to adjust the height of the tool (250). However, if the profile does not match the profile of the reference associated with the selected mode or, in other words, is not valid for the selected mode, processing unit 210 generates a signal to processing unit 212, which in turn disables the valve hydraulics (252).

If it is determined at 244 that a string profile is selected, control passes to 254 where processing unit 210 adjusts the receiver gains and measures the echo times to the string and back to transducers 52 and 54. Based on the echo times, processing unit 210 calculates the height and side shift distance from the string using triangulation methods such as disclosed in U.S. Pat. No. 5,327,345 assigned to Laser Alignment, Inc., which is incorporated herein in its entirety. After the side shift distance and height are calculated (256), processing unit 210 determines to which side of apparatus 10 the sensor assembly is mounted (258) using the technique previously described in detail (see FIG. 19). Where sensor assembly 26 is mounted on the left hand side of apparatus 10, the side shift center may be adjusted, for example, toward the left of sensor assembly 26, whereas if sensor assembly 26 is mounted on the right hand side of apparatus 10, the side shift center may be adjusted towards the right of sensor assembly 26. Control system 22 then passes to 249 where the indicator lights and serial communication outputs are updated. The signal profile is compared to the profile for the string mode. If the signal profile matches the profile of the string mode, then processing unit 210 determines whether the height is within the target range and, if not, adjusts the height of the tool. Therefore, control system 22 uses only three bands—a middle or null band (where no adjustment is needed), a low band (where the position of the tool must be increased), and a high band (where the position of the tool must be lowered). However, if processing unit 210 determines at 250 that the signal profile does not match the profile of the string mode, then processing unit 210 signals processing unit 212 to turn off or disable the valves and processing unit 210 returns to the beginning of the sequence at 240.

Where it is determined at 244 that a curb mode is selected, control passes to 260 where processor 210 pulses transducer 52 and adjusts the receiver gain on the transducer 52 and measures the echo time to the curb and back to transducer 52. Processing unit 210 then calculates the height from the curb. Processing unit 210 then pulses transducer 54. Processing unit 210 adjusts the receiver and measures the echo time to the curb and back to transducer 54 (264). Processing unit 210 then calculates the side shift from the curb (266).

After determining the side shift, processing unit 210 determines on which side of apparatus 10 sensor assembly 26 is mounted (258). If sensor assembly 26 is mounted on the left side, processing unit 210 optionally adjusts the side shift center toward the left side of sensor assembly 26; whereas, if sensor assembly 26 is mounted to the right side of apparatus 10, processing unit 210 optionally adjusts the side shift center toward the right of sensor assembly 26. Again, the indicator light and serial communication outputs are updated and the signal profile is compared to the profile for the selected mode (250). Where the profile is valid for the selected mode, processing unit 210 tests the height of the tool and sends processing unit 212 signals so that processing unit 212 adjusts positioning devices 30, 31, 32 through valve drive circuit 222. Where the profile is invalid for the selected mode, processing unit 210 generates a signal to processing unit 212 which disables or deactivates the valve hydraulics (252) and processing unit 210 returns to the initial conditions.

Figure 18A:
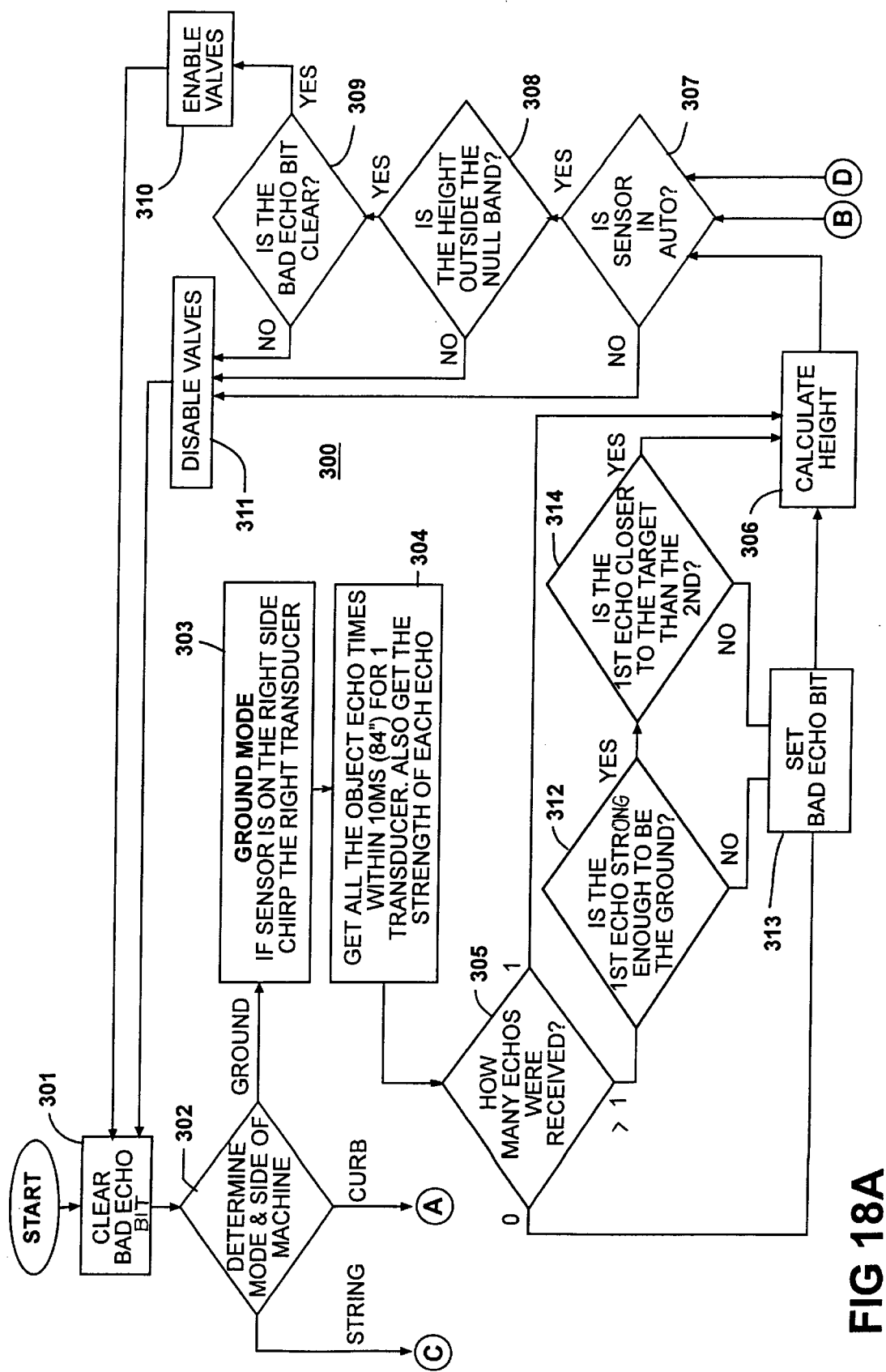
Figure 18B:
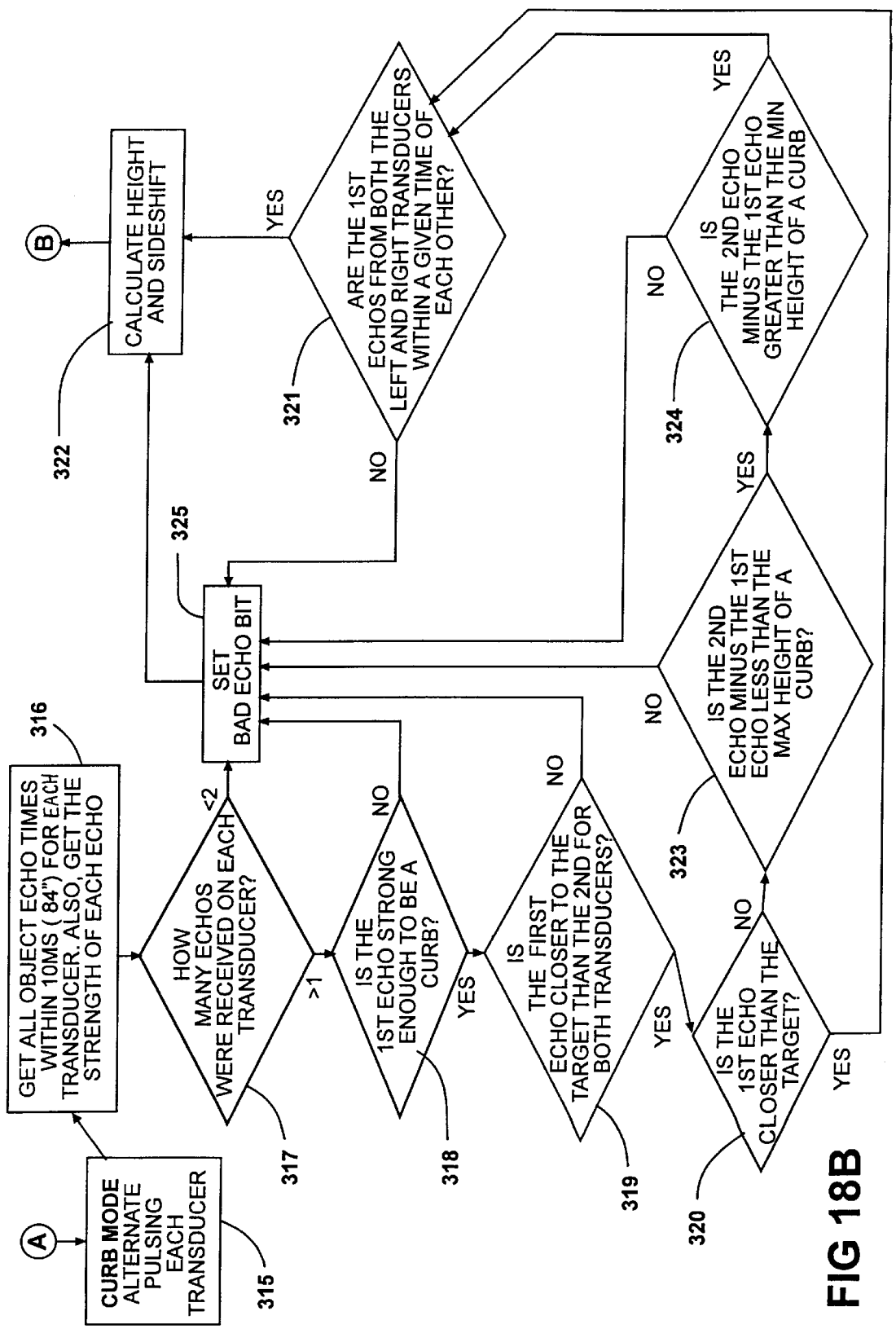

Referring to FIGS. 18A and 18B, a flow chart of a second embodiment of a control routine 300 for system 22 is illustrated. In the second embodiment, processing unit 210 initializes by clearing a bad echo flag or bad echo bit (301).

After clearing the bad echo flag at 301, processor 210 determines the mode of operation of control system 22 and determines the side to which sensor 26 is mounted (302) in the manner previously described. After initializing, if control system 22 is operating in a ground mode processing unit 210 pulses the outermost transducer which corresponds to the side of the apparatus to which sensor assembly 26 is mounted (303). For example, when sensor assembly 26 is mounted on the right side of apparatus 10, processing unit 210 pulses the right transducer, and when sensor assembly 26 is mounted to the left side, processing unit 210 pulses the left transducer. Processing unit 210 preferably monitors all echo times during a given period, for example a 10 ms period, for one of the transducers (304). Furthermore, processing unit 210 determines the strength of each echo (304) and the number of echoes (305). If processing unit 210 detects one echo is received, then processing unit 210 proceeds to calculate the height of the reference (306). After calculating the height, processing unit 212 determines whether the sensor is in auto or manual mode of operation (307). If it is determined that the sensing assembly 26 is not in auto mode, processing unit 212 disables the valves (311) and returns to the beginning of the sequence (301). Where processor 210 determines that the sensor is in the auto mode, processing unit 210 determines whether the height of the object is greater or less than the target range or null band (308). If the height of the object is outside the target range, processing unit 210 then checks to see if the bad echo flag is set. If the bad echo flag is set, processing unit 210 proceeds to send a signal to processing unit 212 to disable the valves of positioning devices 30, 31, and 32. If the bad echo flag is not set, processing unit 210 signals processing unit 212 to enable the valves to adjust the height of the tool. If the height is within the target range or the null band or if the control is not in the "auto" mode, processor 210 signals processor 212 to disable the valves.

Where processing unit 210 detects two or more echoes, processing unit 210 looks at the first echo to determine whether the first echo is strong enough to be the ground (312). If it is determined that the first echo is not strong enough to be the ground, processing unit 210 sets the bad echo flag (313). Where it is determined that the first echo is strong enough to be the ground, processor 210 then compares the first echo to the second echo to determine whether the first echo is closer to the target range than the second echo (314). If the first echo is closer to the target range than the second echo, processing unit 210 calculates the height of the object (306) and proceeds to check whether sensor assembly 26 is in the auto or manual mode (307), whether the height is within the target range or null band (308), and whether the bad echo flag is set (309) or not as described earlier. Where it is determined that the first echo is further from the target range than the second echo, processing unit 210 sets the bad echo flag (313), which ultimately means processing unit 210 will signal processing unit 212 to disable the valves. When processing unit 210 detects that no echoes are received, processing unit 210 sets the bad echo flag.

In contrast, when processing unit 210 determines that the control system 22 is operating in a curb mode, using principles previously described, processing unit 210 alternately pulses each transducer (315) and evaluates all object echo times within the cycle period (316). Furthermore, processing unit 210 also evaluates the strength of each echo (316). After determining the strength of each echo, processing unit 210 determines how many echoes were received by each transducer (317). Where each transducer receives more than two echoes, processing unit 210 evaluates whether the first echo is strong enough to be a curb (318). If it is determined that the fist echo is strong enough to be a curb, processing unit 210 determines whether the first echo is closer to the target range than the second echo for both transducers (319). If it is determined that the first echo is closer to the target than the second echo for both transducers, processing unit 210 then determines whether the first echo is closer than the target (320). If it is determined that the first echo is closer than the target, processing unit 210 then evaluates whether the first echoes from both the left and right transducers are within a given time of each other (321). If it is determined that the first echoes are within a given time of each other, processing unit 210 calculates the height and side shift (321) and proceeds to determine whether the sensing unit 26 is in the auto or manual mode (307), whether the height is outside the null band (308), and whether the bad echo flag is set (309), as described above. If it is determined that the first echo is not closer to the target, processing unit 210 evaluates whether the second echo minus the first echo is less than the maximum height of a curb (323). If it is determined that the second echo minus the first echo is less than the maximum height of a curb, processing unit 210 then determines whether the second echo minus the first echo is greater than the minimum height of a curb (324). If it is determined that the second echo minus the first echo is greater than the minimum height of the curb, processing unit 210 proceeds to determine whether the first echoes from both transducers are within a given time of each other (321). If it is determined that the first echoes from both left and right transducers are not within a given time period of each other, processing unit 210 sets the bad echo flag (325), which ultimately means processing unit 210 will disable the valves (311). If it is determined, that the second echo minus the first echo is less than the minimum height of the curb at 324, processing unit 210 will set the bad echo flag (325). Similarly, if it is determined that the second echo minus the first echo is greater than the maximum height of the curb at 323, processing unit 210 will set the bad echo flag.

Where processing unit 210 detects at 317 that each transducer receives less than two echoes, processing unit 210 sets the bad echo flag at 325. Similarly, where processing unit 210 determines at 318 that the first echo is not strong enough to be a curb, processing unit 210 sets the bad echo flag (325). Furthermore, where processing unit 210 determines at 319 that the first echo is not closer to the target than the second echo for both transducers, processing unit 210 sets the bad echo flag (325). It can be appreciated, that in steps 317–320 and 323 and 324, processing unit 210 is comparing the echoes from the reference to the echoes that are associated with the operating mode to determine whether the sensing unit is operating in a valid condition.

In the string mode, processing unit 210 pulses the outermost transducer (326). In other words, where the sensor assembly 26 is mounted to the right side of apparatus 10, processing unit 210 pulses the right transducer. In contrast, where the sensor is mounted on the left side, processing unit 210 pulses the left transducer. Similar to the ground mode, processing unit 210 evaluates all object echo times within a preselected cycle time for each transducer (327). Furthermore, processing unit 210 evaluates the strength of each echo (327). When it is determined at 328 that each transducer receives more than one echo, processing unit 210 evaluates the strength of the first echo (329) and determines whether the first echo is weak enough to be a string (329). If the echo is weak enough to be a string, the processing unit 210 then determines whether the first echo is closer to the target than the second echo for both transducers at 330. When it is determined that the first echo is closer to the target than the second echo for both transducers, processing unit 210 proceeds to evaluate whether the first echo is closer than the target range (331). If it is determined at 331 that the first echo is further away than the target range, processing unit 210 proceeds to evaluate whether the distance between the first and second echoes is greater than the minimum height of the string (332). If it is determined that the difference between the first and second echoes is less than the minimum height of the string, processing unit 210 sets the bad echo flag (333). If the difference between the two echoes is greater than the minimum height of the string, processing unit 210 evaluates whether the second echo is a reflection of the first echo (334), which is determined by evaluating whether the second echo is two times the first echo time. If it is determined that the second echo appears to be a reflection of the first echo, processing unit 210 proceeds to evaluate whether the second echo is stronger than the first echo (335). If it is determined at 335 that the first echo is not stronger than the second echo, then it is determined to be a reflection of the first echo and processing unit 210 sets the bad echo flag (333). However, when it is determined at 335 that the second echo is stronger than the first, then it is not a reflection and processing unit 210 evaluates whether the first echo from both the left and right transducers is within a given time of each other (336). If it is determined that the first echoes from both left and right transducers are not within the given time of each other, processing unit 210 sets the bad echo flag (333). If the processing unit 210 determines the first echoes from both left and right transducers are within a given time of each other, processing unit 210 calculates the height and side shift and proceeds to evaluate whether the sensor is in auto or manual mode (307), whether the height is outside the null band (308), and whether the bad echo flag is set (309). Similarly, when processing unit 210 determines at 331 that the first echo is closer than the target, processing unit 210 looks to see whether the first echoes from both left and right transducer are within a given time of each other (336). In addition, if it is determined at 334 that the second echo is not a reflection of the first echo and that the second echo minus the first echo is greater than the minimum height of the string, processing unit 210 again evaluates whether the first echo from both left and right transducers are within a given time of each other (336).

When it is determined at 328 that either transducer receives less than two echoes, processing unit 210 sets the bad echo flag, which ultimately causes the processor 210 to disable the valves. Similarly, if it is determined at 329 that the first echo is not weak enough to be a string, processing unit 210 sets the bad echo flag again since the echo profile doesn't match the operating mode profile. When the second echo is closer to the target range than the first echo for both transducers at 330, processing unit 210 also sets the bad echo flag. This could occur, for example, when paving over a string support stake.

In this manner, control routine 300 disables the valves whenever the bad echo flag is set. The bad echo flag is set when the echoes are not representative of the reference associated with the mode in which the system is operating. As described above, this determination is made on several levels. On a first level, processing unit 210 looks at the profile of the echo and determines whether it matches the reference associated with the mode of operation. On another level, processing unit 210 evaluates whether the second echo is closer to the target height than the first echo which suggests there is a potential obstruction. It should be understood from the foregoing that when control system 22 is operating in, for example, a string mode, and sensor assembly 26 receives reflections or echoes that are representative of a ground surface rather than a string, this provides an indication that the string is out of range of the sensor assembly. Thus, control system 22 disables the valves so that tool 20 is not driven to the ground. Further, where control system 22 detects a second echo and that second echo is closer to target range than first echo, for example when an object is present above the string, such as a stake, control system 22 again disables the valves so that the tool is not adjusted to the wrong height.

While several forms of the invention have been shown and described, other forms will now become apparent to those skilled in the art. For example, the two processing units 210 and 212 may be mounted on the same board; however, this will increase the size of sensor unit housing 50. In addition, while the present invention has been described in reference to a manual selection mode, which may be a more reliable method, it should be understood that the control system may be configured to operate in an automatic selection mode in which the control system, based on sampling or other known techniques, determines the mode of operation. Furthermore, other transducers or sensors, including infrared sensors and electromagnetic field sensors may be used in combination with certain of the features of the present invention. In addition, while the description of the positioning devices referred to the positioning devices having hydraulic valves, the positioning devices may include pneumatic valves or other actuating devices, such as servo motors or the like. Changes and modification in the specifically described embodiments can be carried out without departing from the principles of the invention, which is intended to be limited only by the scope of the appended claims, as interpreted according to the principles of patent law including the doctrine of equivalents. Therefore, it will be understood that the embodiment shown in the drawings described above are merely for illustrated purposes only and are not intended to limit the scope of the invention which is defined by the claims that follow.

We claim:

1. A construction tool grade and elevation establishing control for maintaining the vertical position of the construction tool relative to a reference, said construction tool being carried by a tool frame of a construction apparatus, the tool frame being supported for horizontal motion and being adjustably positioned by a hydraulic-tool-positioning device, the hydraulic-tool-positioning device having at least one solenoid operated hydraulic valve and being responsive to signals of a particular configuration from said construction tool grade and elevation establishing control to adjust the position of the construction tool, said construction tool grade and elevation establishing control comprising:

at least one sensor configured to be carried by a construction tool, said sensor generating wave signals and sensor signals, said sensor detecting reflections of said wave signals from a reference, and said sensor signals being generated by said sensor in response to said sensor detecting said reflections and being a function of said reflections and the distance of said sensor to the reference; and a sensor control coupled to said at least one sensor, said sensor control being in communication with and driving said sensor to generate said wave signals and determining the position of the construction tool relative to the reference based on said sensor signals, said sensor control evaluating each of said sensor signals and determining whether said sensor signals represent valid or invalid sensor signals, said sensor control producing an enable signal in response to detecting a valid sensor signal and transmitting said enable signal to solenoid operated hydraulic valve to adjust the position of the construction tool to maintain a desired position of the construction tool with respect to said reference and generating a disable signal in response to detecting an invalid sensor signal and transmitting said disable signal to said solenoid operated hydraulic valve whereby the position of the tool remains substantially unchanged, and said sensor control being adapted to detect a particular configuration of the at least one solenoid operated hydraulic valve, and said sensor control producing said drive signal based on the configuration of the at least one solenoid operated hydraulic valve.

2. The construction tool grade and elevation-establishing control according to claim 1, wherein said sensor includes a sensing range having a lateral extent, said sensor control being adapted to define a movable target position within said sensing range of said at least one sensor whereby said grade and elevation establishing construction tool control can be used to establish the grade and elevation for the tool adjacent a structure without a risk of physical impact with the structure.

3. The construction tool grade and elevation establishing control according to claim 1, wherein said sensor control includes a drive circuit, said drive circuit being coupled to the at least one solenoid operated valve of the hydraulic positioning device and being adapted to test whether the solenoid operated hydraulic valve of the positioning device has a positive or negative common configuration.

4. The construction tool grade and elevation establishing control according to claim 3, wherein said drive circuit includes a first plurality of transistors and a second plurality transistors, said second plurality of transistors for driving said valves, and said first plurality of transistors for testing the valve of the positioning device.

5. The construction tool grade and elevation establishing control according to claim 1, wherein said sensor control is adapted to determine to which side of the construction apparatus said construction tool grade and elevation establishing control is coupled.

6. The construction tool grade and elevation establishing control according to claim 5, wherein said sensor control includes a diode bridge for determining to which side of the construction apparatus said sensor control is mounted.

7. The construction tool grade and elevation establishing control according to claim 5, wherein said at least one microprocessor comprises a first microprocessor, said sensor control further including a second microprocessor, said first microprocessor driving said sensor, and said second microprocessor driving said solenoid operated hydraulic valve of said positioning device.

8. The construction tool grade and elevation establishing control according to claim 1, wherein said sensor control includes at least one microprocessor.

9. The construction tool grade and elevation establishing control according to claim 8, wherein said sensor control includes a selected mode of operation, said sensor control checking against said selected mode for determining whether said control is operating in a valid mode.

10. The construction tool grade and elevation establishing control according to claim 8, wherein said sensor control further determines to which side of said construction apparatus the construction tool grade and elevation establishing control is mounted.

11. The construction tool grade and elevation establishing control according to claim 10, wherein sensor control further determines whether said construction tool grade and elevation establishing control is operating in a valid or non-valid mode, when operating in a non-valid mode said sensor control generating and transmitting a disable signal to said positioning device, when operating in said valid mode said sensor control determining whether the distance to the reference is within a preselected target distance, and when said reference is greater or less than said preselected target height more than a selected tolerance said sensor control generating and transmitting an enable signal to said positioning device to move said construction tool to said desired target distance.

12. The construction tool grade and elevation establishing control according to claim 11, wherein said sensor control determines the height and lateral spacing to said reference based on said signals from said sensor.

13. The construction tool grade and elevation establishing control according to claim 1, wherein said sensor comprises a first ultrasonic transducer, said first ultrasonic transducer generating ultrasonic waves and receiving first and second reflections of said ultrasonic waves, said sensor control determining the location of the tool relative to the reference based on the time said first and second reflections are received.

14. A control system for establishing grade and elevation control for a tool on a construction apparatus, said control system for maintaining the vertical and lateral position of the tool relative to a reference, the tool being movably mounted on the construction equipment, and the construction equipment including at least one positioning device that responds to signals from said control system to adjust the position of the tool, said control system comprising:
   at least one sensor configured to be carried by a construction tool, said sensor including a transducer, said transducer generating energy pulses, and said sensor directing said energy pulses toward a reference and receiving reflections of said energy pulses reflected from the reference; and
   a sensor control coupled to said at least one sensor, said sensor control causing said sensor to generate said energy pulses and determining the position of the construction tool relative to the reference based on said reflections of said energy pulses received by said sensor, said sensor control selectively producing a drive signal in response to said determining and transmitting said drive signal to the tool positioning device to maintain a desired position of said construction tool with respect to said reference, said sensor control evaluating characteristics of said reflections of said energy pulses received by said sensor and determining whether said reflections of said energy pulses represent valid or invalid energy pulses, said sensor control generating not adjusting said positioning device when said sensor control detects an invalid energy pulse is received and selectively adjusting the positioning device when said sensor control detects a valid energy pulse is received.

15. The control system according to claim 14, wherein said sensor control includes a selected mode control, said mode control placing said sensor in a particular mode.

16. The control system according to claim 15, said sensor control determining whether the received energy pulse is valid as a function of the particular mode said sensor control is placed by said mode control.

17. The control system according to claim 15, wherein said mode control selects between at least a string mode, a ground mode, and a curb mode.

18. The control system according to claim 17, wherein said mode control selects a string mode, said sensor control calculating the height and side shift distance from the reference based on received energy pulses.

19. The control system according to claim 18, wherein said sensor control further determines to which side of the construction equipment the sensor control is mounted.

20. The control system according to claim 19, wherein said sensor control determines whether the received energy pulses from the reference fit a valid profile for said string mode in order to evaluate whether energy pulses represent valid or invalid energy pulses.

21. The control system according to claim 17, wherein said mode control selects a ground mode.

22. The control system according to claim 21, wherein said sensor control calculates the height from the ground based on the received energy pulses.

23. The control system according to claim 22, wherein said sensor control further determines whether the received energy pulses fit a valid profile for the ground mode.

24. The control system according to claim 17, wherein said mode control selects a curb mode.

25. The control system according to claim 24, wherein said control sensor calculates the height from the reference based on the received energy pulses.

26. The control system according to claim 25 wherein said sensor control further calculates the side shift from the reference.

27. The control system according to claim 17, wherein said mode control selects a ground mode, said sensor control detecting at least two reflected energy pulses, and evaluating whether a first reflected energy pulse is strong enough to be a ground reflection and comparing the first reflected energy pulse to the second reflected energy pulse if the first energy pulse is strong enough to be a ground reflection to determine whether the first reflected energy pulse is closer to a target range than the second reflected energy pulse.

28. The control system according to claim 27, wherein said sensor control determines that the first energy pulse represents an invalid received energy pulse when said first reflective energy pulse is not strong enough to be a ground reflection.

29. The control system according to claim 27, wherein said sensor control determines that the first reflected energy pulse represents an invalid received energy pulse when said sensor control determines that the first reflected energy pulse is further from the target range than the second reflected energy pulse.

30. The control system according to claim 17, wherein said mode control selects a curb mode, said sensor control evaluating the strength of reflected energy pulses to determine whether a first reflected energy pulse of said reflected energy pulses is strong enough to be a reflection from a curb, and said sensor control determining whether the first reflected energy pulse is closer to a target range than a second reflected energy pulse when said sensor control determines that the first energy pulse is strong enough to be a curb reflection.

31. The control system according to claim 30, wherein said sensor control determines whether the second reflected energy pulse minus the first reflected energy pulse is less than the maximum height of a curb when said sensor control determines that the first reflected pulse is closer to the target than the second reflected energy pulse.

32. The control system according to claim 31, wherein said sensor control determines whether the second reflected pulse minus the first reflected pulse is greater than the minimum height of a curb when the said sensor control determines that the second reflected pulse minus the first reflected pulse is less than the maximum height of a curb.

33. The control system according to claim 32, wherein said sensor control determines that invalid reflected energy pulses have been received when the second reflected energy pulse minus the first reflected energy pulse is less than the minimum height of a curb.

34. The control system according to claim 31, wherein said sensor control determines that invalid reflected energy pulses have been received when the second reflected energy pulse minus the first reflected energy pulse is greater than the maximum height of the curb.

35. The control system according to claim 17, wherein said mode control selects the string mode, said sensor control determining how many reflected energy pulses were received, said sensor control determining an invalid reflected energy pulse was received when only one reflected energy pulse was received.

36. The control system according to claim 35, wherein said sensor control determines whether a first reflected energy pulse is weak enough to be a string reflection when more than one reflected energy pulse is received.

37. The control system according to claim 36, wherein said sensor control determines that the reflected energy pulses are invalid energy pulses when said sensor control determines that the first reflected energy pulse is not weak enough to be a string reflection.

38. The control system according to claim 35, wherein said sensor control determines that the reflected energy pulses are invalid energy pulses when said sensor control determines that the difference between a first reflected energy pulse and a second reflected energy pulse is less than the minimum height of the string.

39. The control system according to claim 14, wherein said sensor control further determines to which side of the construction apparatus said control system is mounted.

40. The control system according to claim 39, wherein said sensor control includes an interface circuit for determining to which side of the construction apparatus the control system is mounted.

41. The control system according to claim 40, wherein said interface circuit includes a diode bridge, said diode bridge for coupling to the power system of the construction apparatus, said interface circuit indicating the direction of current flow through the diode bridge and providing input indicative of said current flow to said sensor control.

42. The control system according to claim 41, wherein said interface circuit further includes a field effect transistor, said diode bridge turning said field effect transistor on and off in response to current flow through said diode bridge, and said field effect transistor providing input indicative of said current flow to said sensor control.

43. The control system according to claim 14, wherein said transducer comprises first and second transducers, said sensor control monitoring the number of reflections received by said first and second transducers, when said transducers receive more than one reflection said sensor control compares a first reflection with a second reflection of said reflections to determine whether the reference represents an invalid condition or a valid condition.

44. A control system for establishing grade and elevation control for a tool on a construction apparatus, said control system for maintaining a vertical lateral position of the tool relative to a reference, the tool being movably mounted on a construction apparatus, and the construction apparatus including at least one positioning device that responds to signals from said control system to adjust the position of the tool, control system comprising:

at least one sensor configured to be carried by construction tool, said sensor generating energy waves toward a reference and detecting reflections of said energy waves, said sensor determining a distance to the reference and generating sensor signals based on said reflections, said sensor signals being a function of the distance to the reference; and a sensor control coupled to said at least one sensor and adapted to define a target position, said sensor control comparing said sensor signals with said target position of the construction tool, said sensor control selectively producing a drive signal in response to the relationship of said sensor signals to said target position and transmitting the drive signal to the tool positioning device to maintain a desired position of said construction tool with respect to said reference, said sensor having a sensing range over a lateral extent, and said target position being movable within the sensing range of said sensor whereby said control system can be used to establish the grade and elevation with the tool adjacent a structure without the risk of physical impact with the structure.

45. The control system according to claim 44, wherein said sensor control is further adapted to detect on which side of the construction apparatus said sensor is mounted.

46. The control system according to claim 45, wherein said sensor control includes a diode bridge for detecting which side of the construction apparatus said sensor is mounted.

47. The control system according to claim 44, wherein said sensor control includes at least one microprocessor.

48. The control system according to claim 47, wherein said at least one microprocessor comprises a first microprocessor, said sensor control further including a second microprocessor, and said first microprocessor driving said sensor, and said second microprocessor being adapted to drive the positioning device of the construction apparatus.

49. The control system according to claim 44, wherein said sensor comprises an ultrasonic transducer.

50. A method of controlling the elevation of a tool of a construction apparatus and for maintaining the vertical position of the tool relative to a reference, the tool being carried by the construction apparatus, and the construction apparatus including at least one positioning device that responds to actuating signals to adjust the position of the tool, said method comprising:

providing a transducer assembly comprising at least one ultrasonic transducer being configured to be carried by the construction apparatus;

selecting a mode of operation;

driving said transducer assembly to produce an acoustic wave;

receiving at least one reflection of the acoustic wave from a reference; and determining whether the received reflection is valid for the selected mode of operation, at least when a valid mode is determined determining the distance from the construction tool to the reference based on the received at least one reflection, comparing the distance to a target distance, and sending an actuating signal to the positioning device when the distance is greater or less than the target distance to adjust the position of the tool.

51. The method according to claim 50, further comprising disabling the positioning device when a reflection is determined to be invalid.

52. The method according to claim 50, wherein said selecting a mode of operation includes selecting between a string mode, a curb mode, and a ground mode.

53. The method according to claim 50, wherein determining whether the received reflection is valid includes evaluating the strength of the at least one received reflection and comparing the strength of the at least one received reflection to the strength associated with the selected mode of operation.

54. The method according to claim 50, wherein determining whether the received reflection is valid includes evaluating the profile of the at least one received reflection and comparing the profile of the at least one received reflection to the profile associated with the selected mode of operation.

55. The method according to claim 50, further comprising determining to which side of the construction apparatus said transducer assembly is coupled.

56. The method according to claim 50, wherein selecting the mode of operation includes selecting a curb mode, and further comprising evaluating the strength of received reflections to determine whether a first received reflection is strong enough to be a reflection from a curb, and determining whether the first received reflection is closer to a target range than a second received reflection when it is determined that the first received reflection is strong enough to be a curb reflection.

57. The method according to claim 56, further comprising determining whether the second received reflection minus the first received reflection is less than the maximum height of a curb when it is determined that the first received reflection is closer to the target than the second received reflection.

58. The method according to claim 57, further comprising determining whether the second received reflection minus the first received reflection is greater than the minimum height of a curb when it is determined that the second received reflection minus the first received reflection is less than the maximum height of a curb.

59. The method according to claim 58, further comprising determining that invalid received reflections have been received when the second received reflection minus the first received reflection is less than the minimum height of a curb.

60. The method according to claim 58, further comprising determining that invalid received reflections have been received when the second received reflection minus the first received reflection is greater than the maximum height of a curb.

* * * * *